(12) United States Patent
Sayers et al.

(10) Patent No.: US 7,304,578 B1
(45) Date of Patent: Dec. 4, 2007

(54) TAG INCLUDING RFID CIRCUIT STORING DATA MODIFIABLE USING A PHYSICALLY ALTERABLE MEDIUM

(75) Inventors: Craig Peter Sayers, Menlo Park, CA (US); Alan Hersh Karp, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 210 days.

(21) Appl. No.: 11/143,225

(22) Filed: Jun. 2, 2005

(51) Int. Cl.
*G08B 13/14* (2006.01)
(52) U.S. Cl. ............................... 340/572.3; 340/572.1; 340/572.4
(58) Field of Classification Search ............. 340/572.1, 340/572.3, 572.4, 572.7, 573.1, 505, 10.4, 340/10.41, 10.42, 10.5, 10.51; 235/383, 235/487, 492
See application file for complete search history.

(56) References Cited

U.S. PATENT DOCUMENTS 6,002,344 A * 12/1999 Bandy et al. ............... 340/10.2
6,278,413 B1 * 8/2001 Hugh et al. ................. 343/818
6,761,312 B2  7/2004 Piatek et al.
6,805,291 B2  10/2004 Chhatpar et al.
6,840,444 B2  1/2005 Pierce et al.
6,869,020 B2  3/2005 Foth et al.
6,869,021 B2  3/2005 Foth et al.
7,168,626 B2 * 1/2007 Lerch et al. ................. 235/492
2004/0074963 A1  4/2004 Pierce et al.
2004/0075348 A1  4/2004 Obrea et al.
2004/0075534 A1  4/2004 Pierce et al.

FOREIGN PATENT DOCUMENTS

GB    2396170 A  *  6/2004

* cited by examiner

*Primary Examiner*—Van T. Trieu

(57) ABSTRACT

A tag includes an RFID circuit storing bits. One or more of the bits are modified in response to physically altering a portion of a medium that the RFID circuit is affixed thereto. Also, the RFID circuit is activated in response to physically altering a portion of the medium.

40 Claims, 19 Drawing Sheets

US 7,304,578 B1

TAG INCLUDING RFID CIRCUIT STORING DATA MODIFIABLE USING A PHYSICALLY ALTERABLE MEDIUM

TECHNICAL FIELD

The technical field relates generally to a tag including an RFID circuit.

BACKGROUND

RFID tags are being used or are currently proposed as being used for tracking everything from live animals to pallets of products. RFID tags are programmed to contain digital information either during the manufacturing of the read only memory portion of the RFID circuit, or in the field using electromagnetic radio frequency signals to store information in the nonvolatile memory portion of the RFID tag. It may be beneficial to enter information in the tag, such as entering information about the item being tracked. However, one of the difficulties involved in the utilization of RFID tags is that if a user wants to enter information into the RFID tag, the user typically has to use a specialized device that communicates with the RFID tag through a radio frequency. To avoid requiring the user to use a specialized device to enter information in the tag, the user may provide the information to the tag manufacturer for entering into the tag. However, this requires the user to disclose the information to the manufacturer, and also requires the user to determine the information to be entered into in the tag well in advance.

BRIEF DESCRIPTION OF THE DRAWINGS

Various features of the embodiments can be more fully appreciated, as the same become better understood with reference to the following detailed description of the embodiments when considered in connection with the accompanying figures.

DETAILED DESCRIPTION

For simplicity and illustrative purposes, the principles of the embodiments are described. Moreover, in the following detailed description, references are made to the accompanying figures, which illustrate specific embodiments. Changes may be made to the embodiments without departing from the spirit and scope of the embodiments.

Figure 1:
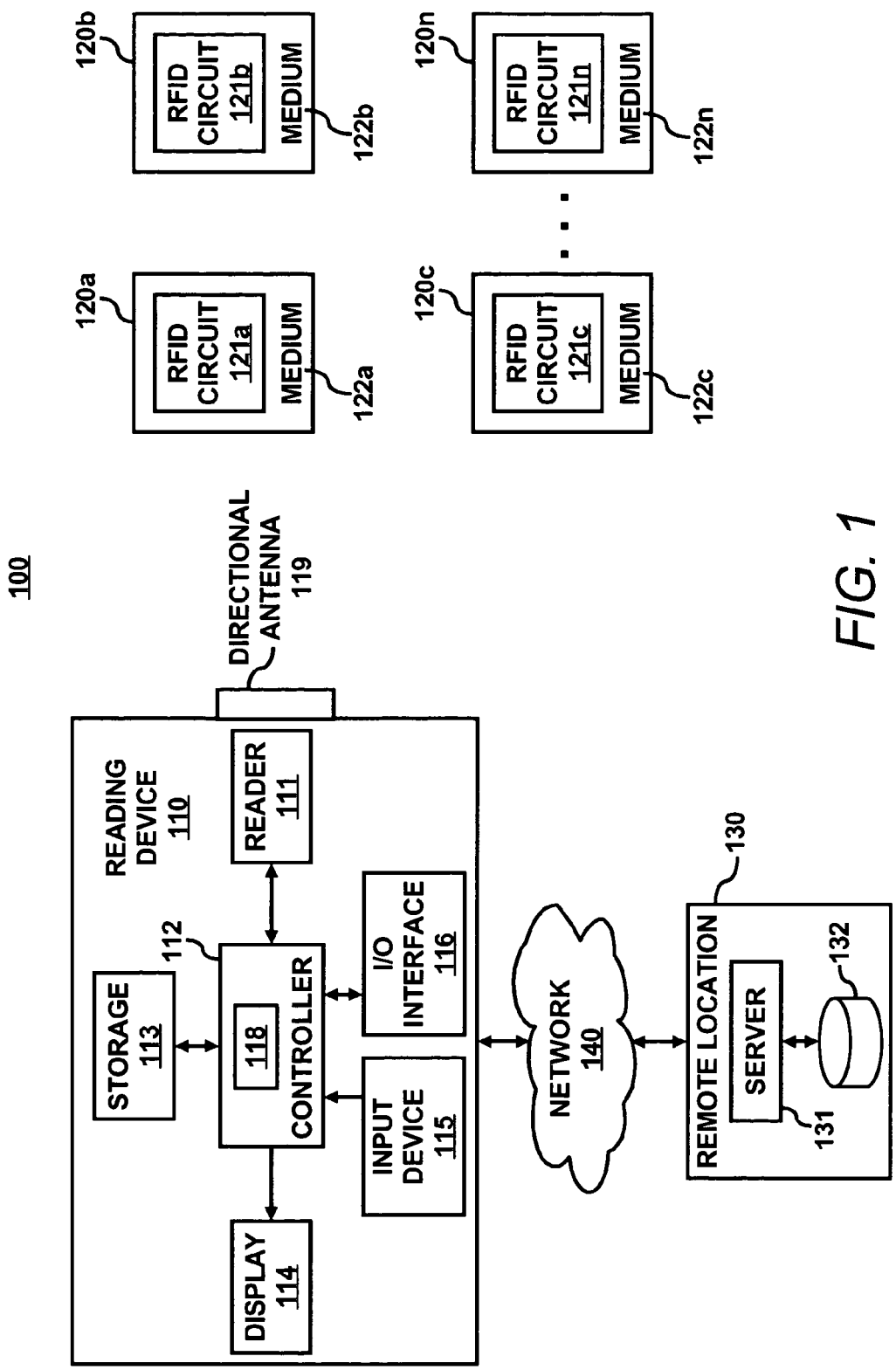
FIG. 1 illustrates a system, according to an embodiment.

FIG. 1 illustrates a system 100, according to an embodiment. The system 100 includes a reading device 110, a plurality of tags 120a . . . n, and a remote location 130. The reading device 110 includes a reader 111, a controller 112, storage 113, a display 114, an input device 115, and an input/output (I/O) interface 116. The reader 111 includes a reader operable to read the tags 120a . . . n. In one embodiment, the tags 120a . . . n include RFID circuits 121a . . . n, and the reader 111 includes an RFID reader operable to read the RFID circuits 121a . . . n.

The controller 112 executes software 118 for performing the functions of the reading device 110. Examples of the functions include receiving data from the reader 111 and storing data in the storage 113, receiving user commands via the input device 115 and executing the commands, and displaying requested data, such as data stored in the storage 113, transmitting data via the I/O interface 116 to the remote location 130 or another device.

The storage 113 includes electronic storage, such as RAM, ROM, a hard drive, flash memory, or another known type of storage device. The display 114 and the input device 115 are user I/O devices for communicating with a user. Examples of the input device 115 include a keyboard, a stylus, a touch screen which is incorporated in the display, and a mouse. A speaker not shown may also be included as an output device.

The I/O interface 116 includes one or more interfaces for communicating with another device. One example of the I/O interface 116 is a network interface for communicating via the network 140. For example, the reading device 110 sends data to and receives data from the remote location 130 via the network 140 using the network interface. Another example of the I/O interface 116 may include a port, such as a USB port or a Firewire port, where a cable is used to connect the reading device 110 to another device, such as a portable storage device.

The system 100 includes tags 120a . . . n. In one embodiment, the tags 120a . . . n include RFID circuits 121a . . . n and mediums 122a . . . n where each of the RFID circuits are affixed to at least a portion of the medium. The mediums 122a . . . n are physically alterable. Examples of a medium that may be used for the mediums 122a . . . n include paper, plastic, cardboard, fabric, wood, animal hide, and other mediums that may be physically altered. Examples of physically altering the medium include tearing, breaking, puncturing, or marking, for example, with a conductive ink or graphite.

The RFID circuits 121a . . . n may include RFID chips and one or more circuits that allow data stored in the RFID circuits 121a . . . n to be modified in response to one or more actions. Each action may include physically altering a portion of a medium where at least a portion of the RFID circuit is affixed. Also, the RFID circuits 121a . . . n may include circuits that activate and deactivate the RFID chips in response to physically altering a portion of the medium. Examples of activation and deactivation include making the RFID circuit inoperable to be read (e.g., turning it off) and making the RFID circuit operable to be read (e.g., turning it on). An example of making the RFID circuit operable to be read may include instructing a semi-active or active tag to turn on with a radio frequency (RF) signal as is known in the art or setting a switch either manually or electronically for a passive, active or semi-active tag. In another example, activating and deactivating may be performed by changing one or more bits stored in the RFID circuit. For example, an activated tag may include an RFID circuit storing a "1" for a particular bit of a plurality of bits stored in the RFID circuit and a deactivated tag may include a "0" for that bit.

Figure 3A:
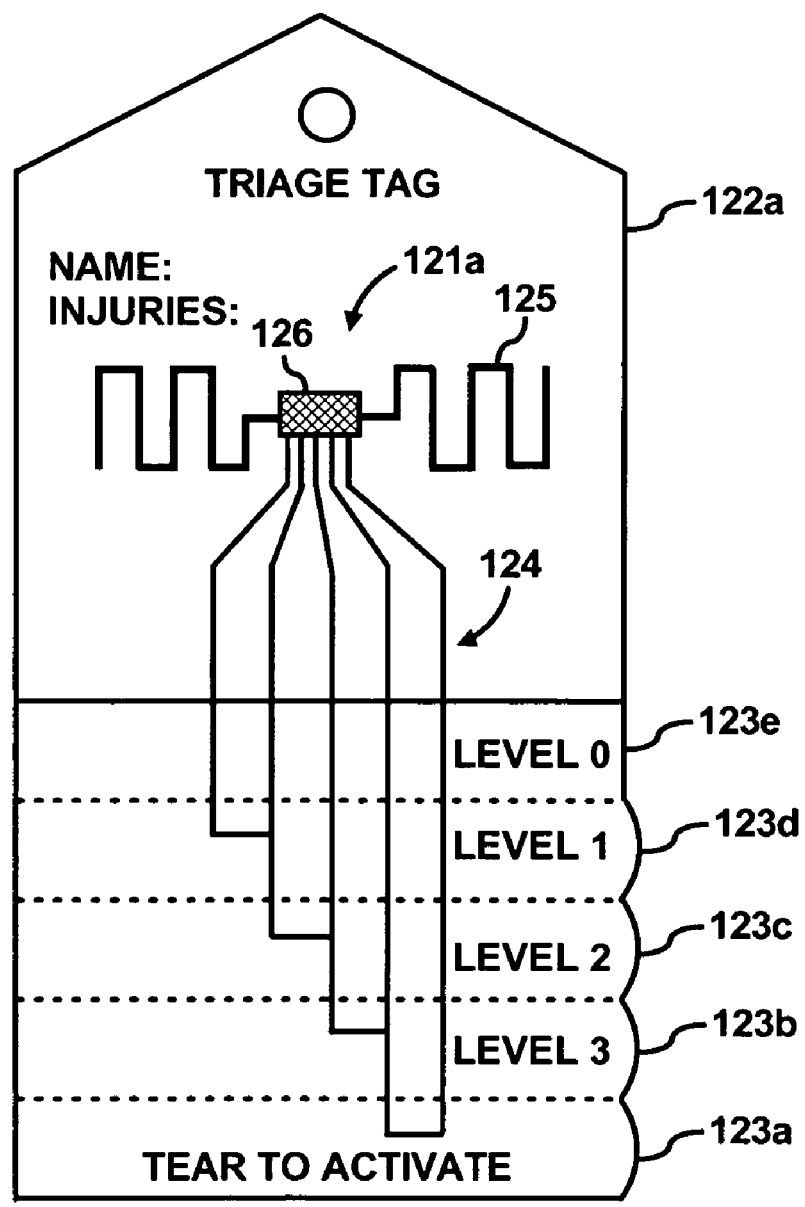
FIG. 3A-E illustrate embodiments of a tag.
Figure 3B:
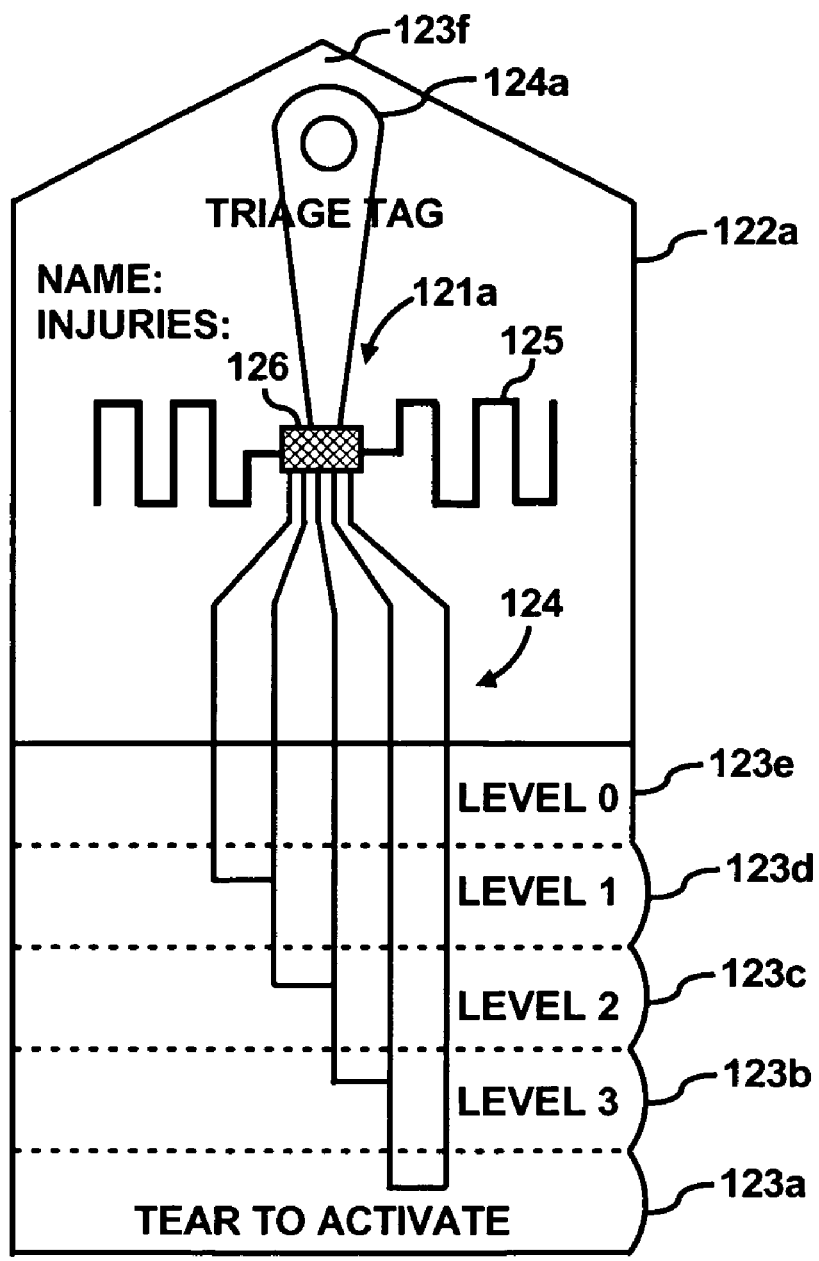
Figure 3C:
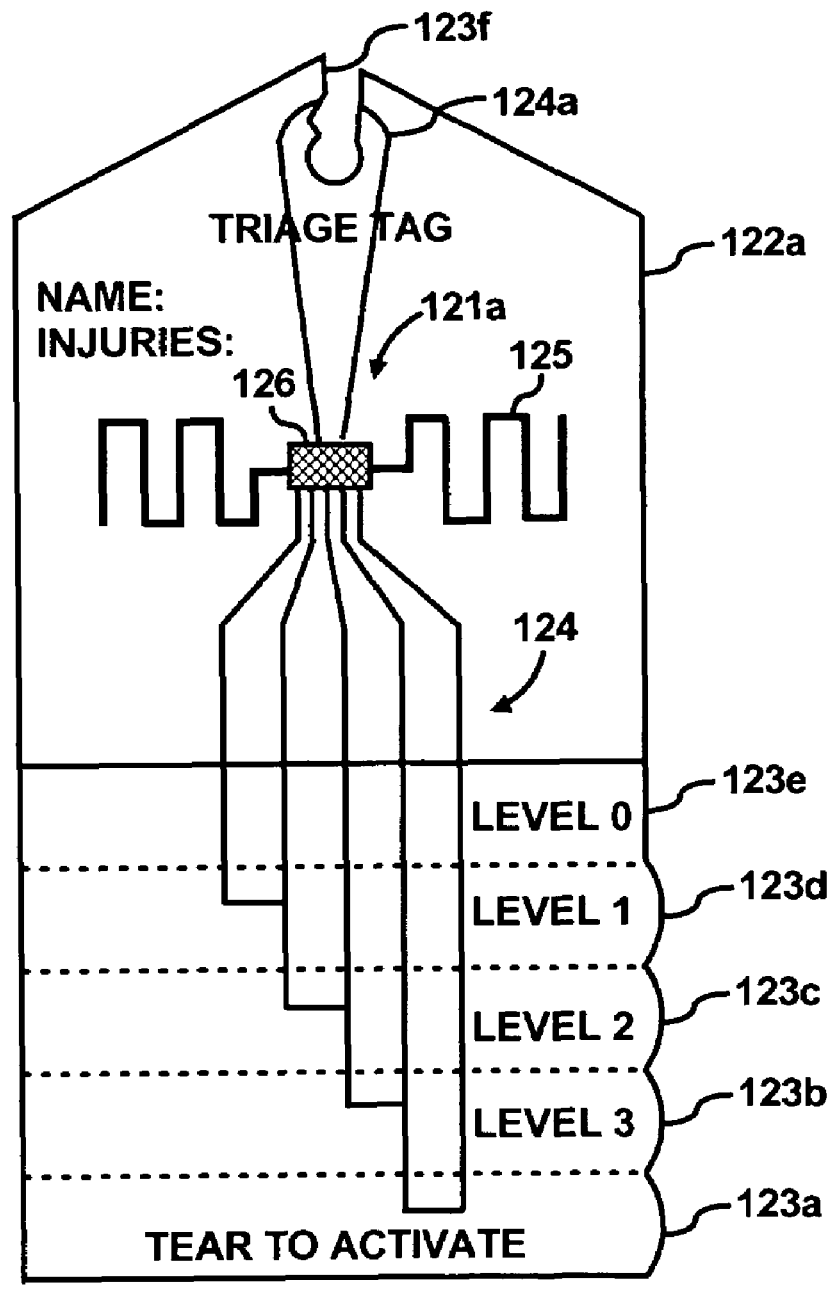
Figure 3D:
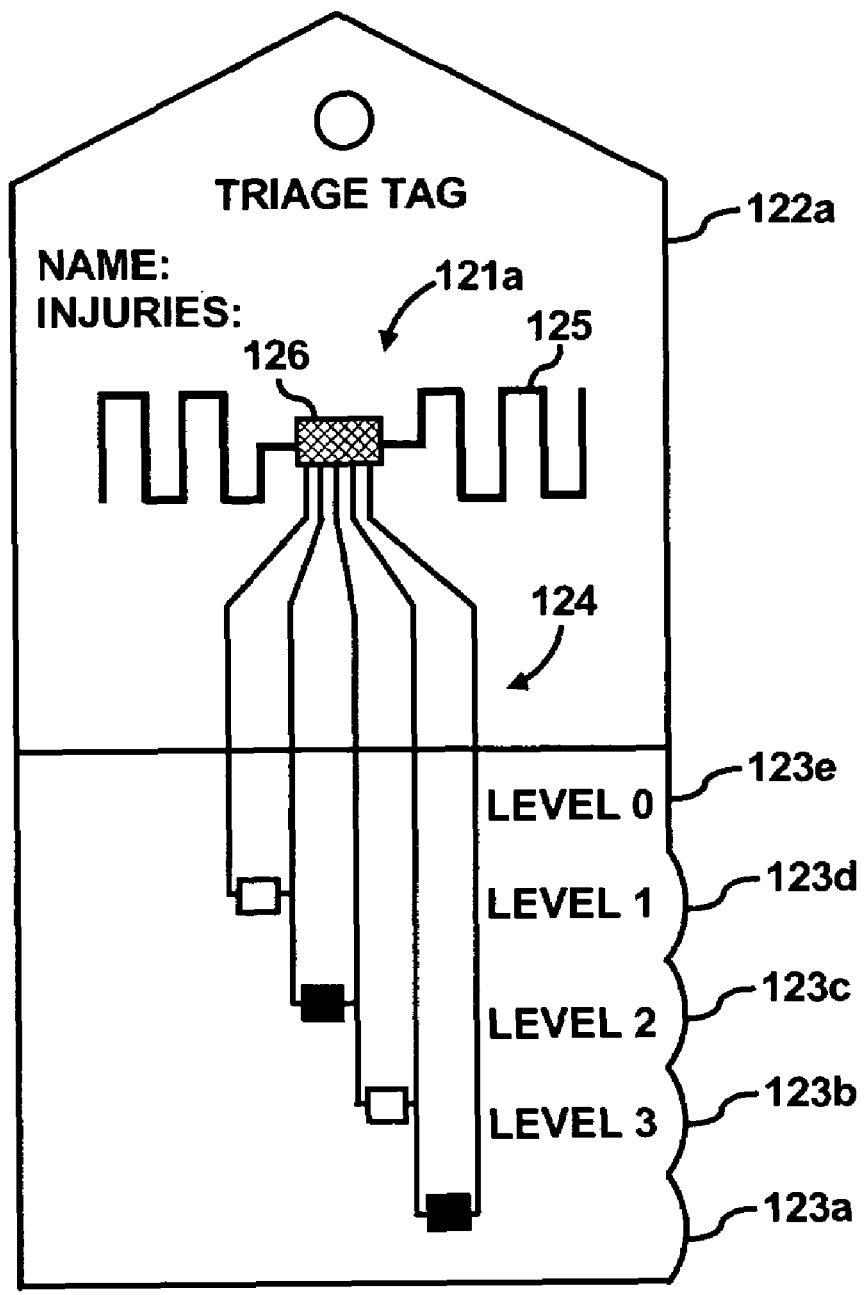
Figure 3E:
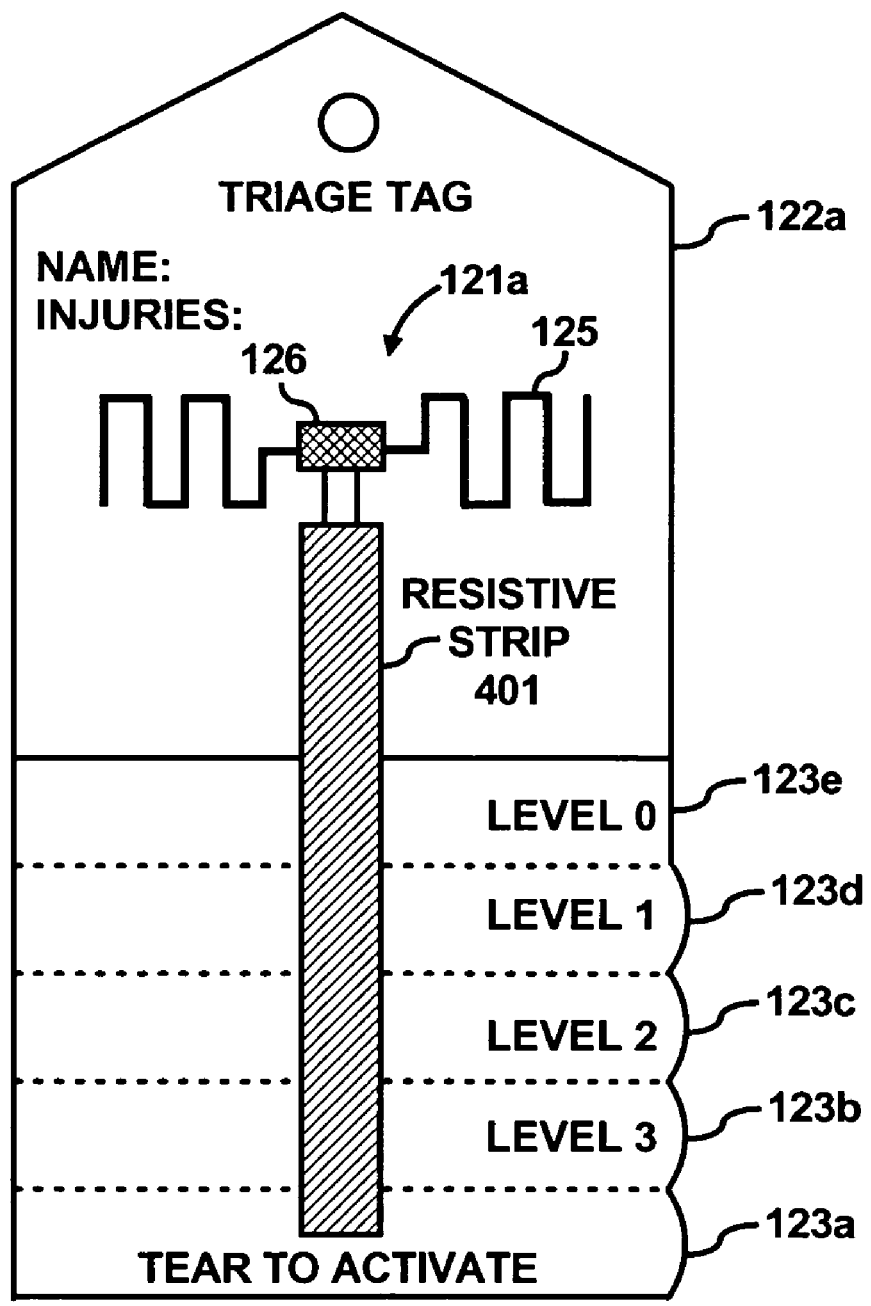
Figure 4A:
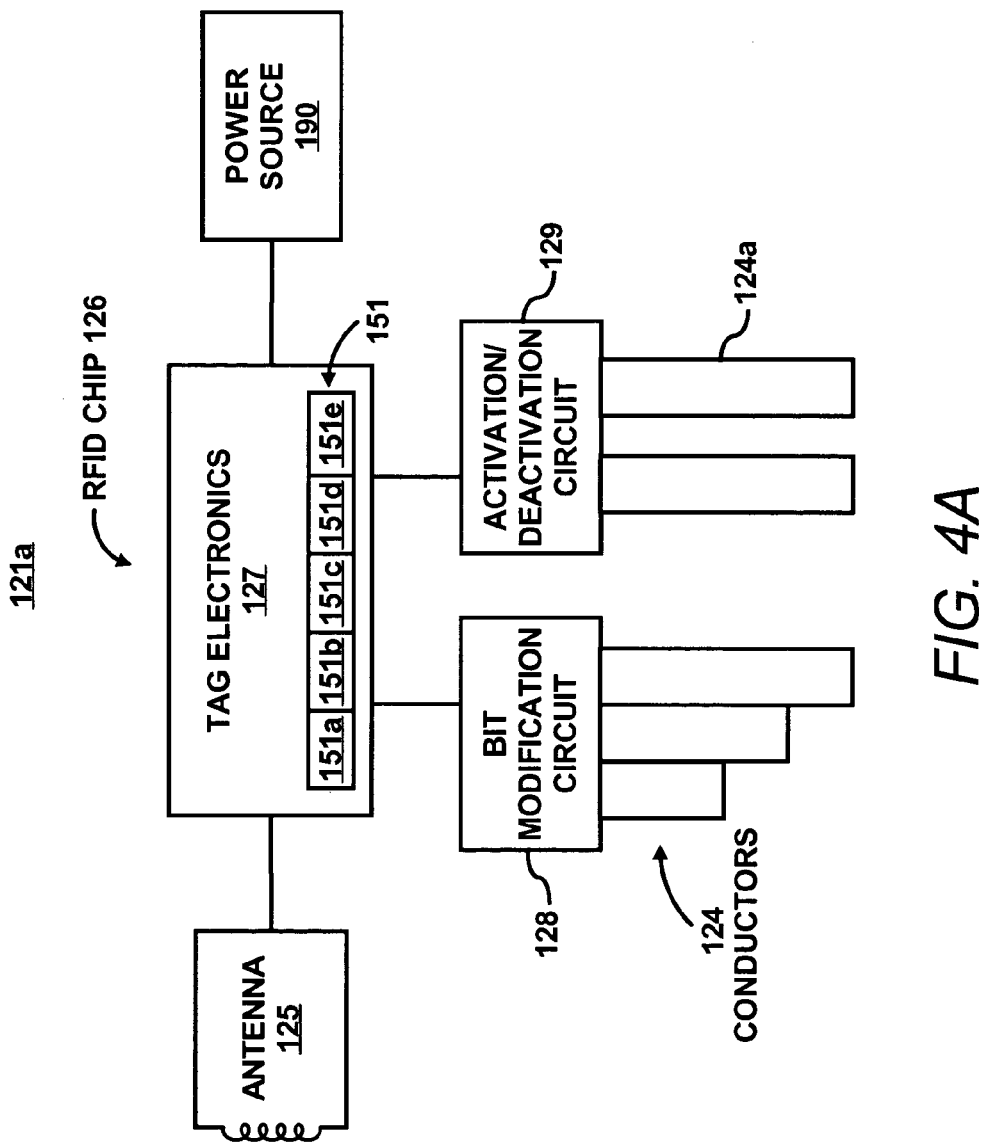
FIGS. 4A-B illustrate block diagrams embodiments of RFID circuits.

An RFID circuit, such as one of the RFID circuits 121a . . . n, is shown in FIG. 4A and described below. Examples of the tags are shown in FIGS. 3A-E, 7A, and 8-11.

The tags 120a . . . n store data which is read by the reading device 110 and stored at the reading device 110, for example, in the storage 113. The data may be transmitted to the remote location 130 via the network 140. The remote location 130, for example, includes a server 131 and a database 132 for storing data read from the tags 120a . . . n.

Figure 2:
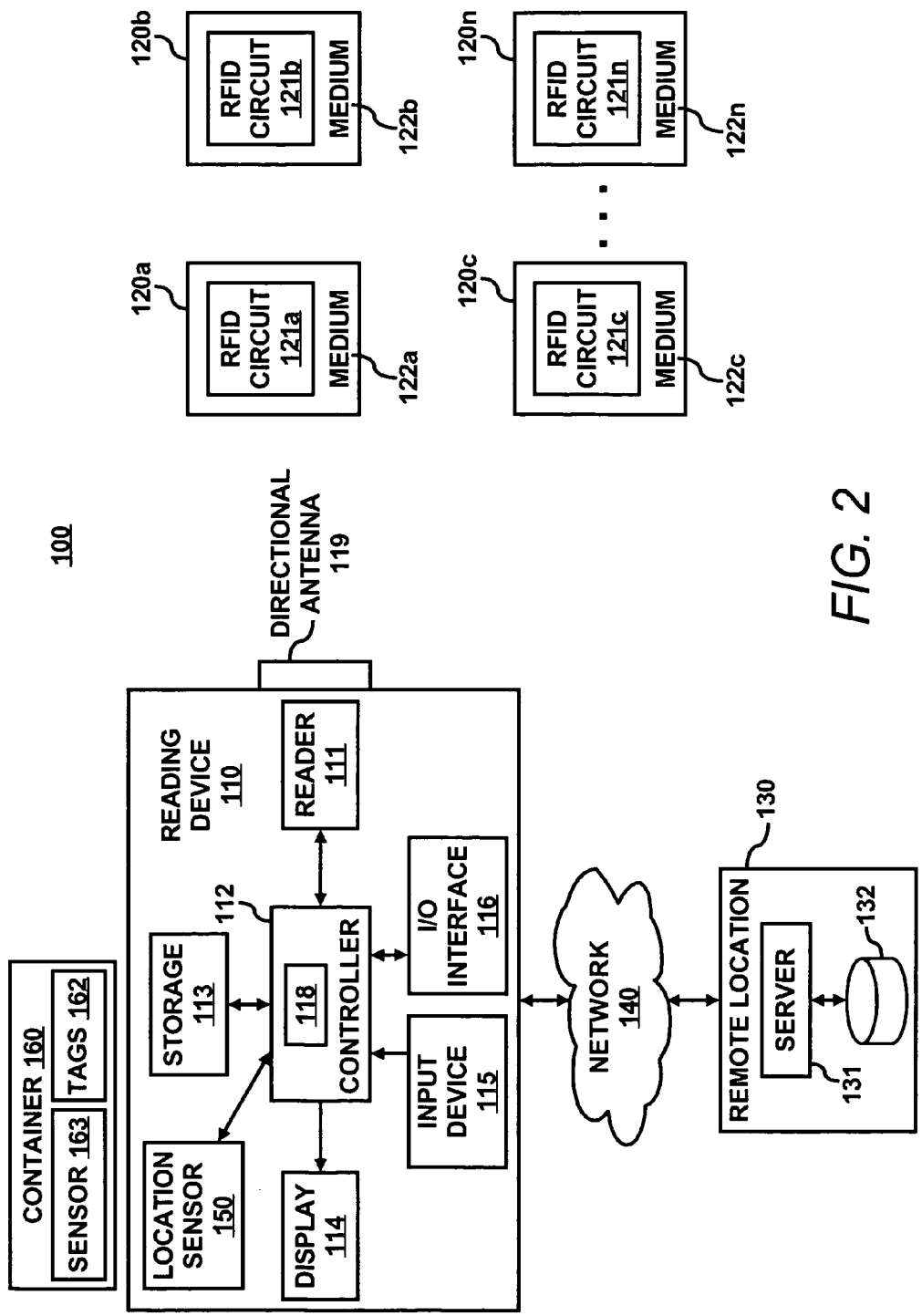
FIG. 2 illustrates the system, according to another embodiment.

The system 100 may be used for a variety of applications and may use a variety of types of tags. For example, the system 100 may be used for counting items, such as food items, clothing items, patients or injured victims, having the tags 120a . . . n attached thereto. The system 100 may be used for counting the number of patients having classifications based on illness or severity of injury, which is identified in tags, counting the number of loaves of bread about to expire or the number of loaves on a shelf, or counting the number of surveys in which the service was rated "excellent". The system may be used to indicate how many critical patients to expect, or help a bakery predict how many loaves to produce the next day. The system 100 may be used for collecting the data from tags 120a . . . n having particular characteristics and optionally send data to the remote location 130, wherein the particular characteristics are represented by the bits that can be modified and stored in each tag. The system 100 may be used for recording the location of a tag, such as when first activated or at other times, and optionally sending that data to the remote location 130. FIG. 2 illustrates an embodiment with a location sensor.

The system 100 may be used for finding and reading data from tags with particular characteristics, such as finding the nearest critical patient or finding the oldest loaf of bread. The system 100 may be used for determining a number of RFID circuits storing information representing items having particular characteristics. The system 100 may be used for finding the location of emergency personnel by knowing they carry a number of triage tags or finding a batch of bread that was contaminated.

According to an embodiment, tags are provided. A tag includes an RFID circuit and a medium that the RFID circuit is attached. The tag can be activated, deactivated or have data stored in the tag modified in response to physically altering the medium. For example, removing a triage tag turns it off or cutting off all the tabs from a clothing tag turns it off. Tags can show a visual indication based on data stored and read from the RFID circuits on the tags. The tags may be used with the system 100, such as the tags 120a . . . n, or may be used with other systems.

FIG. 4A illustrates a block diagram of the RFID circuit 121a according to an embodiment, and which may be used in any of the tags shown in FIGS. 1 and 2. The RFID circuit 121a may include the RFID chip 126, the antenna 125, tag electronics 127, such as known in the art, a bit modification circuit 128 and an activation/deactivation circuit 129. For example, the tag electronics 127 may include a memory 151 with one or more regions, such as regions 151a-e, for storing bits. The access to the regions 151a-e may be changed as described in further detail below. The tag electronics 127 may also include a clock, a rectifier, and other known components of an RFID tag chip not shown.

The bit modification circuit 128 is operable to modify at least one bit stored in the RFID circuit 121a in response to an action, such as physically altering one of the portions 123b-e of the medium 122a shown in FIGS. 3A-D. Modifying at least one bit may include changing a value of a bit previously stored in the RFID circuit 121a or storing a new value in the RFID circuit 121a if no value is stored for that bit. As described above, in one example a portion of the medium 122a is physically altered to select the appropriate priority level for the victim. In one embodiment, physically altering includes breaking one of the conductors 124, such as described with respect to FIGS. 3A-C and 3E, to create an open circuit, which is detected by the bit modification circuit 128. For example, the bit modification circuit 128 detects an open circuit and modifies a stored bit representing the priority level. In another embodiment, circuits are selectively shorted, for example using conductive ink or graphite, such as shown in FIG. 3D, which is detected by the bit modification circuit 128. Marking with a graphite pencil instead of conductive ink allows erasing the marking. This change can reverse the RFID change (e.g., open to closed circuit or vice versa), leave it alone, or note that a change was made. This way, you can determine how many times the person changed his mind, for example, using a counter in the RFID chip 126 or by reporting a change to a reader on each occurrence. A detected short circuit is used to modify one or more bits stored in the RFID circuit 121a.

The activation/deactivation circuit 129 is also operable to detect an open circuit in one embodiment or detect a short circuit in another embodiment caused by physically altering a portion of the tag 120a, such as one of the portions 123a or 123f, similarly to the bit modification circuit 128. For example, if the portion 123a shown in FIG. 3A is physically altered, the activation/deactivation circuit 129 activates the RFID circuit 121a. If the portion 123f, shown in FIGS. 3B-C is physically altered, the activation/deactivation circuit 129 deactivates the RFID circuit 121a.

The bit modification circuit 128 and the activation/deactivation circuit 129 may include circuits known in the art for detecting an open or short circuit or a change in resistance. For example, a comparator may be used to detect an open or short circuit. For detecting a change in resistance, for example an analog-to-digital converter may be used in a circuit to measure a change in resistance of the resistive strip 401 to output a signal to the tag electronics 127 based on the measured resistance.

The RFID chip 126 may include a power source 190, such as a battery. For example, the RFID chip 126 may be active or semi-passive, where the RFID chip 126 is awakened by a signal from the reading device 110 and then uses the power source 190 to transmit stored data to the reader 110. If the RFID chip 126 is active or semi-passive, the tag 120a may be activated and deactivated using the activation/deactivation circuit 129 to conserve power. The RFID chip 126 may be passive and in that embodiment the RFID chip 126 does not include the power source 190. A passive RFID chip is powered by an interrogation signal received from the reading device 110, as is known in the art. If the RFID chip 126 is passive, the activation/deactivation circuit 129 may still be used. However, the activation/deactivation circuit 129 is optional for passive, active, or semi-passive RFID chips. It will be apparent to one of ordinary skill in the art that the bit modification circuit 128 and the activation/deactivation circuit 129 may be combined into a single circuit and may share conductors. For example, as shown in FIG. 3A, a conductor of the conductors 124 in the portion 123a used for activating the RFID circuit 121a may also be used as part of a closed circuit that is broken when one of the portions 123b-e is removed.

Figure 4B:
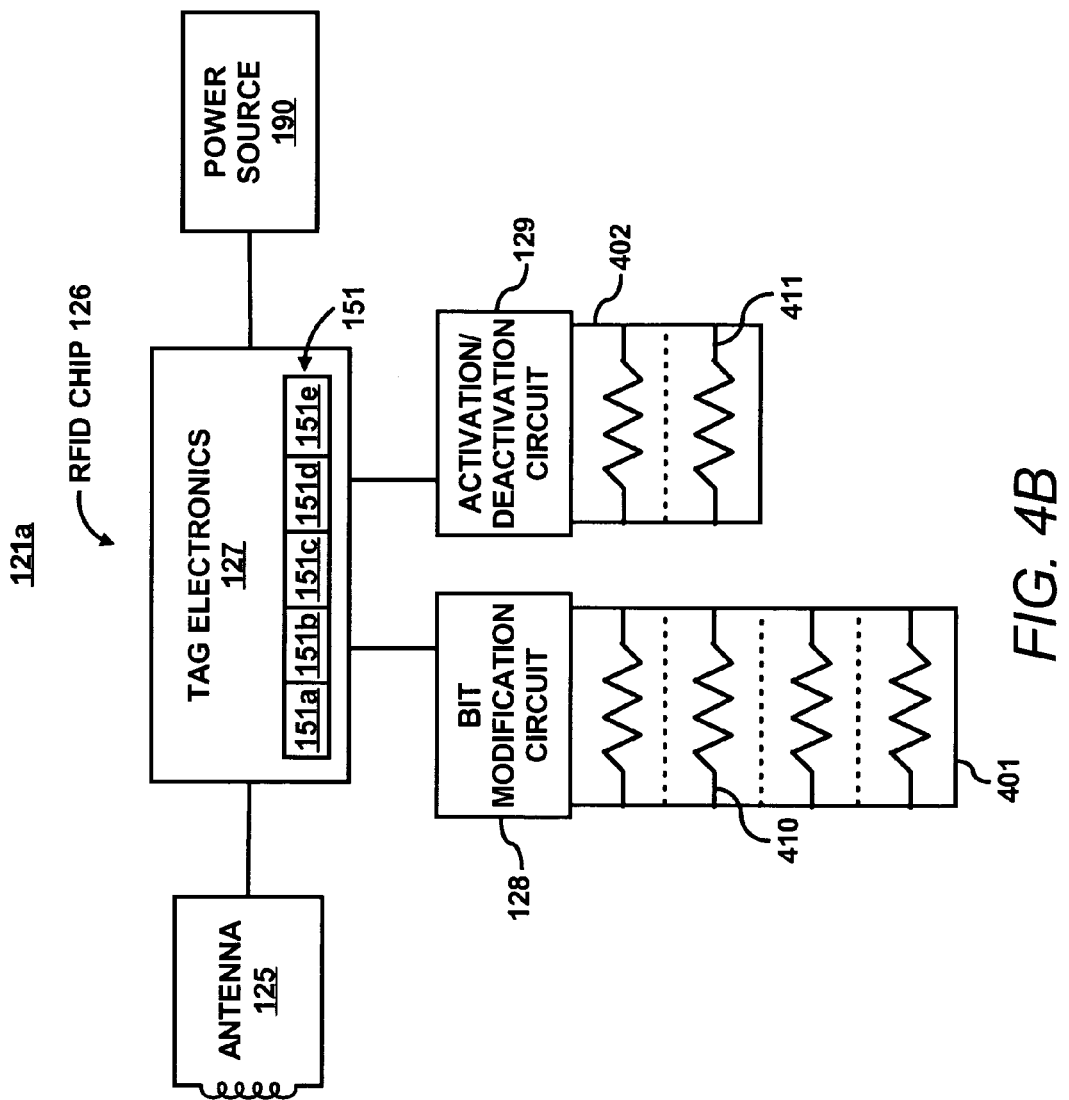

FIG. 4B illustrates a block diagram of the RFID circuit 121a according to another embodiment, which may be used in any of the tags shown in FIGS. 1 and 2. Similarly to the embodiment shown in FIG. 4A, the RFID circuit 121*a* may include the RFID chip 126, the antenna 125, tag electronics 127, such as known in the art, a bit modification circuit 128 and an activation/deactivation circuit 129. In this embodiment, instead of the conductors 124 being input into the RFID chip 126, resistive strips 401 and 402 are used.

The resistive strip 401 includes resistors 410 in parallel and the resistive strip 402 includes resistors 411 in parallel. Perforations are shown in dotted lines as examples of where portions of the medium 122*a* may be torn to modify stored bits or activate or deactivate the RFID circuit 121*a*.

Examples of tags used in different applications and different embodiments of tags are shown in FIGS. 3A-E, 7A, and 8-11. It will be apparent to one of ordinary skill in the art that the different embodiments of the tags may be used for applications other than shown and described.

FIG. 3A illustrates an embodiment of the tag 120*a*. This embodiment of the tag 120*a* shown in FIG. 3A may be used for any of the tags in the systems shown in FIGS. 1 and 2. The tag 120*a* includes the RFID circuit 121*a* affixed to the medium 122*a*. Examples of affixing the RFID circuit 121*a* to the medium 122*a* include attaching the circuit 121*a* or portions of the circuit 121*a* to the medium 122*a* with an adhesive, printing the circuit 121*a* or portions of the circuit 121*a* on the medium 122*a*, or embedding the circuit 121*a* or portions of the circuit 121*a* in the medium 122*a*.

The medium 122*a* includes a medium where at least a portion of the medium may be physically altered. Examples of the medium 122*a* include paper, plastic, cardboard, fabric, wood, animal hide, etc. Examples of physically altering the medium include tearing, breaking, puncturing, or marking, for example, with a conductive ink or graphite.

The medium 122*a*, for example, includes portions 123*a* . . . *e* where the medium 122*a* may be physically altered. Any portion of the medium 122*a* that may be physically altered to modify bits stored in the RFID circuit 121*a* or to activate or to deactivate the RFID circuit 121*a* is, for example, a user interface for the tag 120*a*.

In one example, the tag 120*a* is a triage tag. A portion of the tag 120*a* is physically altered. For example, the portion 123*a* is removed from the tag 120*a* at the respective perforation to activate the tag 120*a*, such as when the tag 120*a* is removed from the container 160 shown in FIG. 2 or when the tag 120*a* is placed on a victim. Removing a portion of the tag 120*a* shown in the example of FIG. 3 may include tearing at a perforation or breaking. The tag 120*a* may also be activated if any of the portions 123*b* . . . *e* are removed from the tag 120*a*.

Also, bits stored in the RFID circuit 121*a* are modified to indicate the priority level of the victim in response to a portion of the tag 120*a* being physically altered. For example, two bits stored in the RFID circuit are designated for storing priority levels 0-3 and are modifiable to represent the appropriate priority level. In this example, if the victim is deceased, the portions 123*a* . . . *d* are removed from the tag 120*a* because the victim is a priority level 0 in this example. This results in "00" being stored for the two bits. If the victim is a level 2 priority level, then portions 123*a* and 123*b* are removed from the tag 120*a*. Removal of the portions 123*a* and 123*b* results in "10" being stored for the two bits. For example, the two bits are originally "00" and the first bit is modified to "1".

FIGS. 3B and 3C illustrate another embodiment of the tag 120*a*. This embodiment of the tag 120*a* shown in FIGS. 3B and 3C may be used for any of the tags in the systems shown in FIGS. 1 and 2. This embodiment of the tag 120*a* shown in FIGS. 3B and 3C is the same as the embodiment shown in FIG. 3A except the tag 120*a* also includes an additional conductor 124*a* of the conductors 124 connected to the RFID chip 126. If a portion 123*f* where the conductor 124*a* is affixed is physically altered, such as broken or torn, then the RFID chip 126 is deactivated such that the RFID chip 126 is not operable to transmit data stored therein. For example, after a victim is treated at a hospital, the tag 120*a* is pulled from a string, such as shown in FIG. 3C. The conductor 124*a* is broken causing an open circuit which is detected by the RFID chip 126. The RFID chip 126 deactivates in response to the physically altering of the portion 123*f*.

FIG. 3D illustrates yet another embodiment of the tag 120*a*. This embodiment of the tag 120*a* shown in FIG. 3D may be used for any of the tags in the systems shown in FIGS. 1 and 2. This embodiment of the tag 120*a* shown in FIG. 3D is the same as the embodiment shown in FIG. 3A except the portions 123*a* . . . *d* of the tag 120*a* are physically altered by marking with conductive ink or graphite. For example, FIG. 3D illustrates portions 123*a* and 123*c* physically altered by marking with conductive ink or graphite. Although not shown in FIG. 3D, this embodiment may also include the portion 123*f* shown in FIGS. 3B and 3C that may be physically altered by marking, such as shown in FIG. 3D.

FIG. 3E illustrates yet another embodiment of the tag 120*a*. This embodiment of the tag 120*a* shown in FIG. 3E may be used for any of the tags in the systems shown in FIGS. 1 and 2. This embodiment of the tag 120*a* shown in FIG. 3E is the same as the embodiment shown in FIG. 3A except instead of conductors 124, a resistive strip 401 is used. The resistive strip 401 is affixed to portions 123*a* . . . *d* of the tag 120*a*, which may be physically altered. The resistive strip 401 includes, for example, resistors in parallel in each of the portions 123*a* . . . *d*. The greater the number of resistors in parallel in the resistive strip 401 the lower the resistance detected at the RFID chip 126. If one of the portions 123*a* . . . *d* is physically altered, such as by removing a portion, the resistance of the resistive strip 401 detected at the RFID chip 126 changes and may be used by the RFID chip 126 to alter one or more bits based on the detected resistance. In one example, the resistive strip 401 includes a material having resistive properties. For example, the resistive strip 401 includes a strip of material that is moderately conductive, such as a film of carbon, with two conductors along the long edges. The longer the strip, the lower the resistance between the conductors. Physically altering the length of the strip changes the resistance of the strip, which is detected by the RFID chip 126 for modifying bits stored therein. Although not shown in FIG. 3E, this embodiment may also include the portion 123*f* shown in FIGS. 3B and 3C.

Figure 7A:
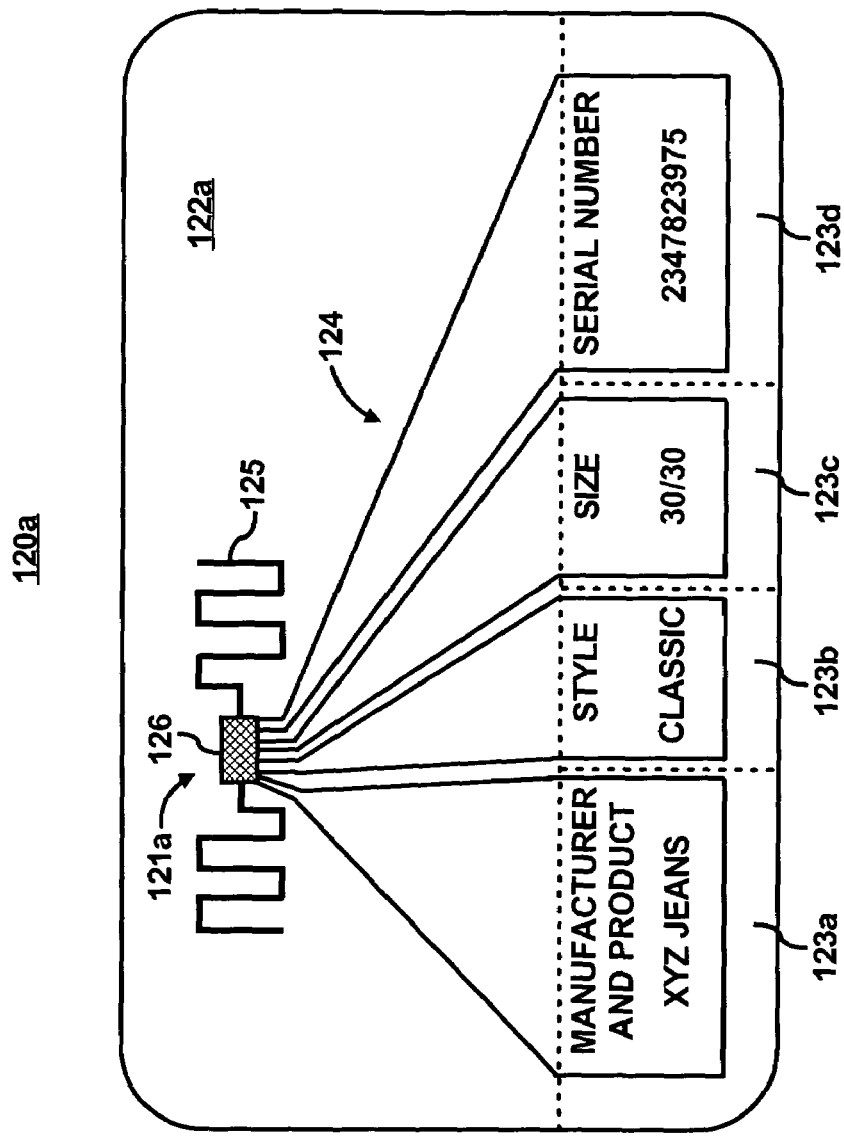
FIG. 7B illustrates a flow chart of another method, according to an embodiment.

The tag 120*a* shown in FIG. 7A allows a user to selectively control the information that can be read from the tag 120*a*. The tag 120*a*, for example, is a clothing tag, but it will be apparent that the tag 120*a* may be used for other applications. Physically altering one or more of the portions 123*a-d* of the medium 122*a* disables or changes a portion of the data stored in the RFID circuit 121*a*. For example, physically altering the portion 123*a* controls bits stored in the RFID circuit 121*a* representing the manufacturer of the clothing item (e.g., jeans). Physically altering the portions 123*b-d* controls bits stored in the RFID circuit 121*a* representing the style of the clothing item, the size of the clothing item and a serial number, respectively.

The information that can be read from the RFID circuit 121*a* depends on the portions physically altered on the tag 120*a*. For example, the tag 120*a* is placed on the clothing item purchased by a user. If the user does not want to be tracked, then the user may only remove the portion 123d controlling the serial number bits. Then, the serial number bits are changed or disabled. For example, the serial number bits are each changed to "0" or these bits are disabled. If the user does not want the size known, the user removes the portion 123c.

In one embodiment, the availability of bits stored in the RFID circuit 121a is modified in response to detecting a physical action. A physical action may include physically altering the medium 122a, such as removing one or more of the portions 12a-d, or leaving one or more of the portions 123a-d intact.

Changing the availability of bits stored in memory in the RFID circuit 121a may include changing the access control of one or more regions of memory, such as the regions 151a-e shown in FIGS. 4A-B. A region of memory, for example, includes a set of addresses in the memory. Access control may include granting or denying read and/or write access to a region. According to an embodiment, regions of a memory in an RFID circuit are determined. A physical action is associated with an access control for each region. One of the physical actions is detected and the access control of the region associated with the detected physical action is changed. A request for access, such as a read or a write, to the memory is received, and access is only provided to the regions allowed by the access control for each region. For example, the access control for some regions may be denied and access to those regions s denied. As described in further detail below, examples of denying access may include masking bits for denying access, such as changing bits to "0" stored in the regions where access is denied or outputting "0" for those bits to a reader without changing the bits stored in those regions. In another example, the regions where access is denied are made invisible to a user or device accessing the memory. Thus, the RFID circuit pretends to have less memory than it actually has.

In one example, bits stored in the RFID circuit 121a are selectively masked. For example, an algorithm performed by the RFID circuit 121a for selectively masking bits stored within the RFID circuit 121a includes storing a table of <physical action>, <bit mask> pairs. A reader requests the tag 120a to provide information. The RFID circuit 121a, for example, detects a physical action altering the medium 122a requesting that information not be reported, such as removing portion 123c shown in FIG. 7A. The RFID circuit 121a searches the table for a physical action corresponding to the removal of the portion 123c and identifies the corresponding bit mask for that physical action. The RFID circuit 121a computes the information to be transmitted to the reader using the identified bit mask. For example, the bit mask masks the size of purchased jeans because the portion 123c shown in FIG. 7A was removed from the tag, and thus the information transmitted to the reader does not identify the size of the jeans. In this embodiment, the bit masking may even be performed with RFID circuits that store a tag ID in ROM. Optionally, the RFID circuit 121a replaces the information stored in the tag with the information computed using the identified bit mask to make a permanent change in the information stored in the tag.

In another embodiment, changing bits stored in the RFID circuit 121a in response to a physical action includes storing bits representing the status of portions of the medium 122a that have been physically altered. For example, the RFID circuit 126 stores a table including <physical action>, <bit mask>, <lock> triples. The initial value of "lock" is false for all entries. A reader requests the tag 120a to provide an identifier. The RFID circuit 121a detects a physical action, such as a physical altering of a portion of the medium 122a, requesting that certain information not be reported. A corresponding "lock" bit value for the detected physical action is set, for example to "1". The RFID circuit 121a determines the bits stored in the RFID circuit to mask based on the set value. For example, for each set "lock" bit, i.e., a "lock" bit set to a predetermined value, the RFID circuit 121a retrieves a corresponding bit mask from the table. Then, the information to be transmitted to the reader is computed using the one or more retrieved bit masks. This embodiment may be used even if the tag ID or other information is stored in ROM. Also, this embodiment may be used to compute and send information to a reader without permanently storing the computation results. Alternatively, the computation results may be permanently stored in the RFID circuit 121a.

Also, in another example, the tag 120a or at least some of the information stored therein may revert to read-only. For example, tearing off one of the portions 123a-d shown in FIG. 7A may allow memory in the RFID circuit 121a to be written exactly once. Afterwards the tag 120a reverts to read-only. This may be performed using two "lock" bits, such as one "lock" bit to indicate a first action has been performed to unlock a region of memory and a second "lock" bit to indicate the memory had been written and can not be further altered. For example, a first lock bit may be associated with each of a set of bits comprising one or more bits. Each of the first lock bits is also associated with particular physical actions. A first lock bit value is set to a predetermined value in response to detecting a corresponding physical action. A reader reads the first lock bit value and writes a value to the corresponding set of bits. The value is read by the RFID circuit 121a and the RFID circuit sets a corresponding second lock bit indicating that the set of bits have been written.

In another embodiment, the RFID circuit 121a has a more complex memory. In this embodiment, the RFID circuit stores a table of <physical action>, <start address to block>, <size> triples. The "start address to block" and "size" are used to determine a range of addresses corresponding to different information stored in the RFID circuit 121a. For example, the information associated with each of the portions 123a-d shown in FIG. 7A is stored in a respective range of addresses. A range of addresses may be represented by a "start address to block"+"size" for an entry in the table. The RFID circuit 121a detects a physical action, such as removal of the portion 123c, requesting not to report the size information. The RFID circuit 121a identifies the range of bits associated with the detected physical action from the table and masks them or modifies them (e.g., sets those bits to "0") such that the size information is not transmitted to a reader.

The reader is operable to request information stored in an address or range of addresses from the RFID circuit 121a. For example, the reader requests information stored at an address in the RFID circuit 121a. The RFID circuit 121a determines the corresponding range associated with the address using the table. The RFID circuit 121a transmits the information stored at the range of addresses to the reader. In the example described above where the portion 123c was removed, if the requested address was in the range of addresses associated with the portion 123c, then the reader may receive all "0"s. This embodiment may be used even if information stored in the RFID circuit 121a is stored in ROM. Also, "lock" bits may be used to make changes permanent.

In this embodiment, for example, sets of addresses in memory in an RFID circuit are determined. Each set of addresses is associated with a physical action of a plurality of physical actions. One of the physical actions is detected by the RFID circuit. The availability of bits stored in the set of addresses associated with the detected physical action is modified, such as modifying the bits or masking the bits. A reader may transmit a request including an address in the RFID circuit. The RFID circuit determines a set of addresses associated with the address and transmits the bits stored in the addresses or masks the bits.

In yet another embodiment, the memory in the RFID circuit 121*a* is reduced. For example, a table stores the following:

| <physical action> | <memory size> |
|---|---|
| remove portion 123a | 80 |
| remove portion 123b | 40 |
| remove portion 123c | 20 |
| remove portion 123d | 10 |

For example, if the portion 123*a* shown in FIG. 7A is removed, the RFID circuit 121*a* behaves as a tag with only 80 bytes of memory, and if the portion 123*b* is removed, the RFID circuit 121*a* behaves as a tag with only 40 bytes of memory and so on.

A "physical action" may also include leaving a portion of the medium 122*a* intact. For example, an entry in the table may include:

| <physical action> | <memory size> |
|---|---|
| portions 123a-d intact | 120 |

In this example, if all the portions 123*a-d* are intact then the memory is 120 bytes. If, for example, the portion 123*a* is removed, the memory behaves as an 80-byte memory and the information associated with the portion 123*a* is not included in the 80-byte memory and not transmitted to the reader.

As described in this embodiment, the memory may be reduced in response to detecting a "physical action". Reducing the memory may not necessarily include removing a portion of the memory. Instead, data associated with the portion of the reduced or removed memory may be deleted or modified, such as changed to "0"s, or masked or made non-readable.

The embodiments described above are applicable to the tags described herein other than the tag shown in FIG. 7A. Also, a physical action is not limited to removal of a portion of a medium and may include other actions associated with physically altering a medium, such as tearing the medium or using conductive ink to mark the medium. Also, the embodiments above are described as using tables. However, other methods may be used, such as a series of "IF" statements, for performing the function of the tables.

Leaving some of the portions on the tag 120*a* can be helpful later. For example, after purchasing the clothing item, if the user enters another store including, for example, the reading device 110 shown in FIG. 1, the reading device 110 may transmit the style of clothing to the remote location 130, assuming the portion 123*b* is not removed. The remote location 130 transmits to the reading device 110 clothing items in the store that have the same style. These clothing items may be displayed on the display 114 shown in FIG. 1 for the user.

Figure 7B:
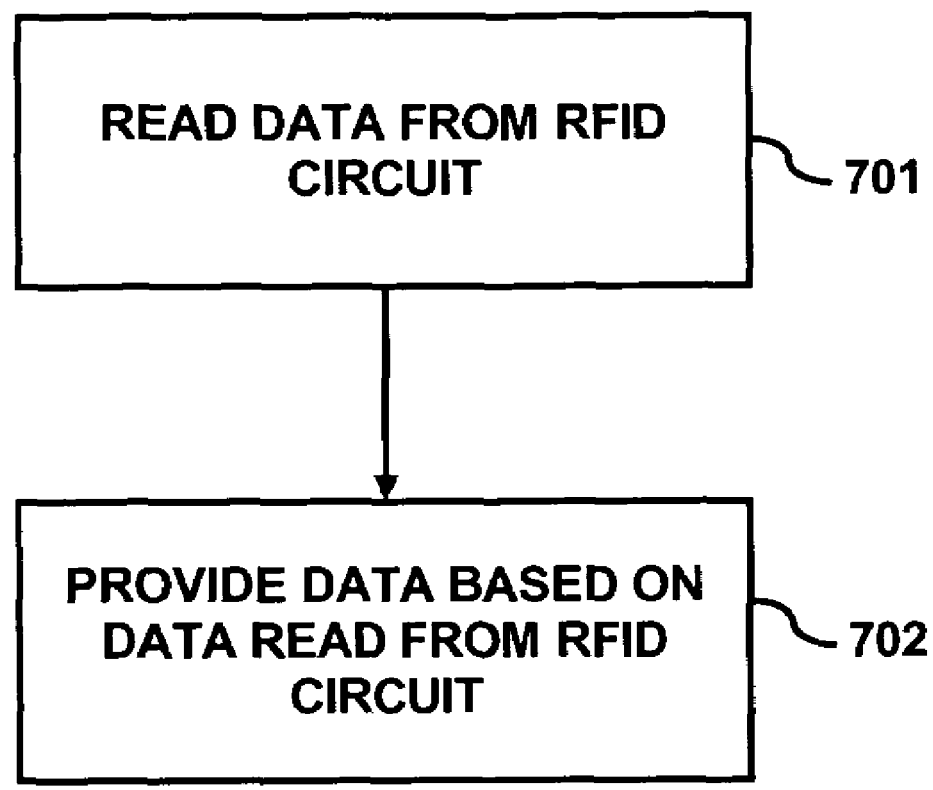

FIG. 7B illustrates a method 700, according to an embodiment. The method 700 is described with respect to the tag shown in FIG. 7A and the system 100 shown in FIG. 1 by way of example and not limitation. At step 701, the reading device 110 reads data from the RFID circuit 121*a* of the tag 120*a* shown in FIG. 7A. At least some of the data includes at least one bit modified in response to physically altering a portion of the medium 122*a* of the tag 120*a*.

At step 702, data is provided to a user based on the data read from the tag 120*a*. For example, the tag 120*a* transmits data representing a style of previously purchased jeans. The remote location 130 which receives the style from the reading device 110 determines data to be provided to a user, such as clothing having a style similar to a style read from the tag 120*a*. The database 132 at the remote location 130 may be queried to retrieve the information about clothing having a similar style.

Figure 8:
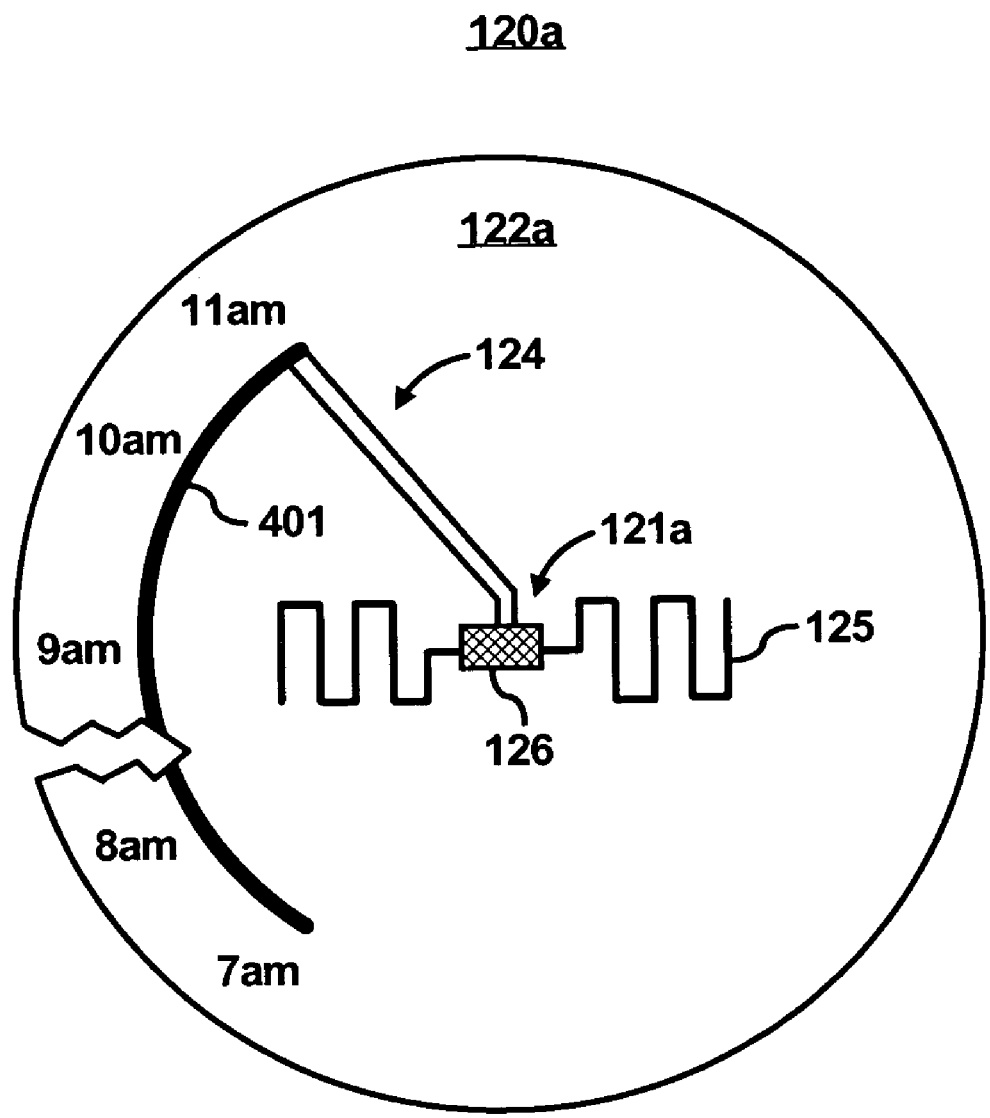
FIGS. 8-11 illustrate embodiments of a tag.
Figure 9:
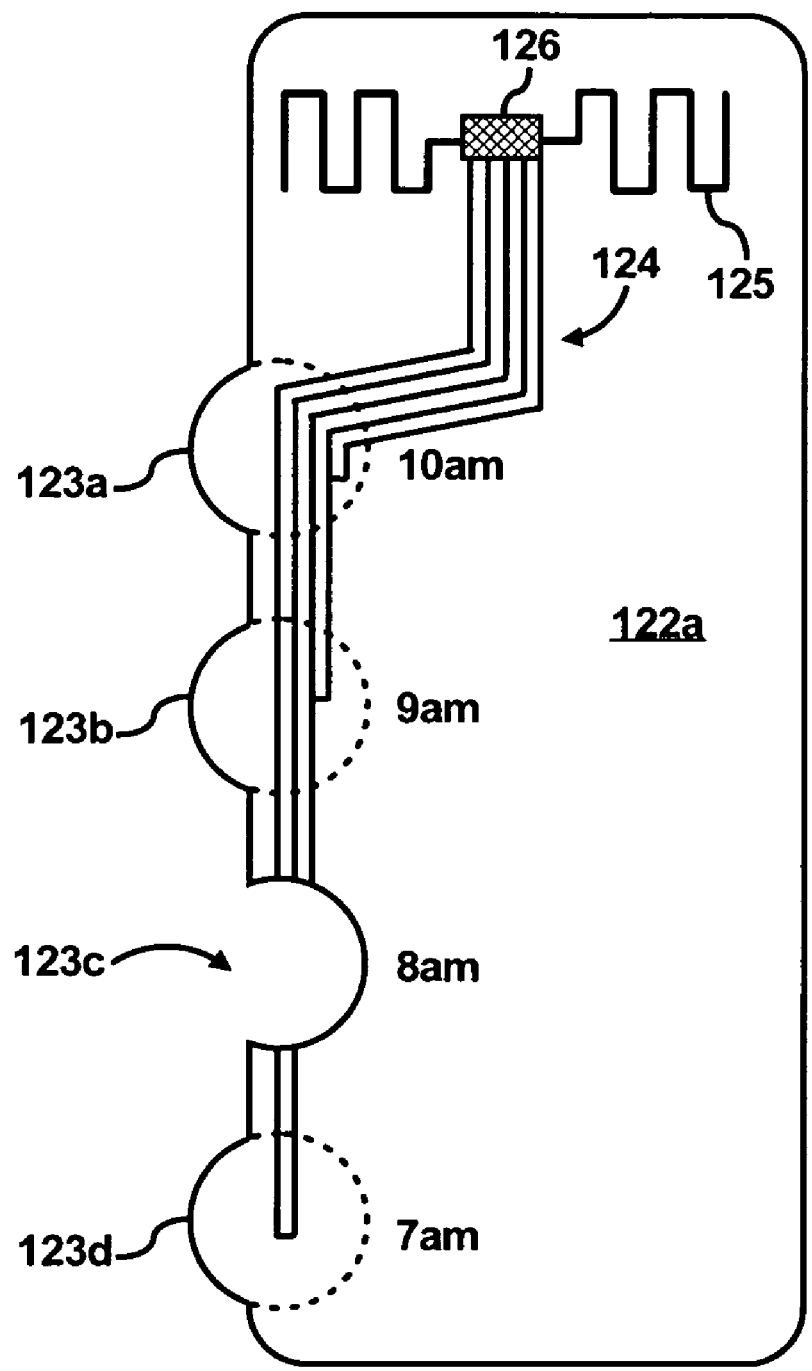

FIGS. 8 and 9 illustrate embodiments of adding information to the tag 120*a*. For example, the tag 120*a* shown in FIG. 8 is a tag that may be attached to packaging for a food item, such as bread. For example, a baker simply tears a particular portion of the medium 122*a* associated with a time the bread was baked. As shown in FIG. 8, the tag 120*a* includes a resistive strip 401. The medium 122*a* is torn at a portion associated with 8:30 AM to indicate the time the loaf was baked. The change in resistance resulting from tearing the resistive strip at the portion associated with 8:30 AM is measured and stored in the RFID circuit 121*a*, such as described with respect to FIGS. 3E and 4B. The tag 120*a* is attached to the packaging for the bread. Now a shopper can see when the bread was baked and at the same time the store can use the reading device 110 shown in FIG. 1 to scan all the bread on the shelf and quickly identify loaves that are not fresh, such as loaves that are older than say 5 hours.

Tags using a resistive strip, examples of which are shown in FIGS. 3E and 8, include and RFID circuit that is operable to change the availability of information stored in the RFID circuit of the tag in response to physically altering the medium where the resistive strip is affixed. Change the availability of information may include modifying bits stored in the RFID circuit or controlling the information transmitted from the RFID circuit. For example, some information stored in the RFID circuit may be selectively masked such as described above in detail.

FIG. 9 illustrates an embodiment of the tag 120*a* that may also be attached to a bread packaging. However, removable tabs at the portions 123*a-d* are used to provide visual indication of a time the bread was baked and to modify bits stored in the RFID circuit 121*a* to represent the time the bread was baked. The tags shown in FIGS. 8 and 9 may be used with other food items, such as meat or milk. Instead of removable portions, in another embodiment, conductive ink may be used to mark portions of the medium 122*a* to modify bits stored in the RFID circuit 121*a*.

Figure 10:
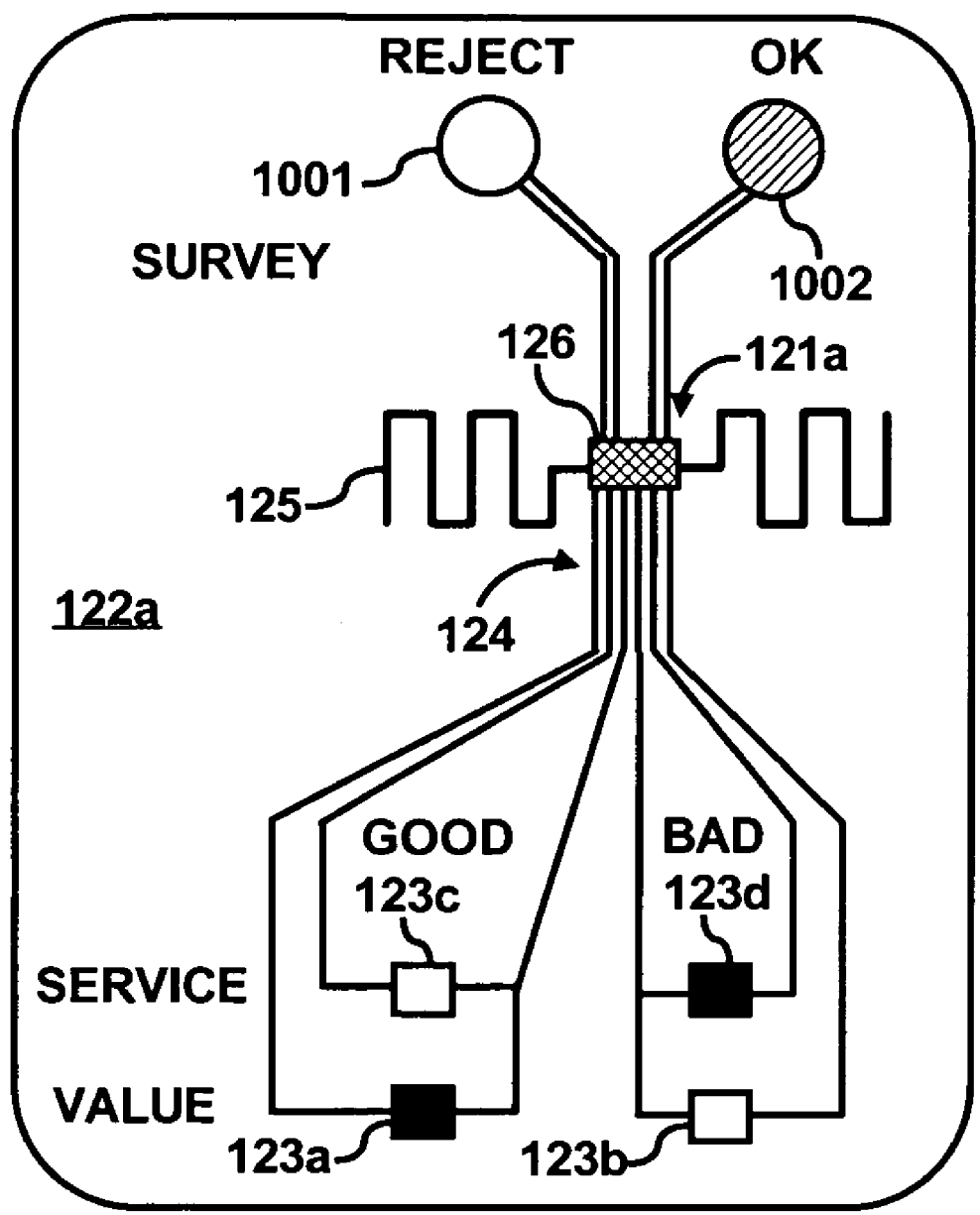
Figure 11:
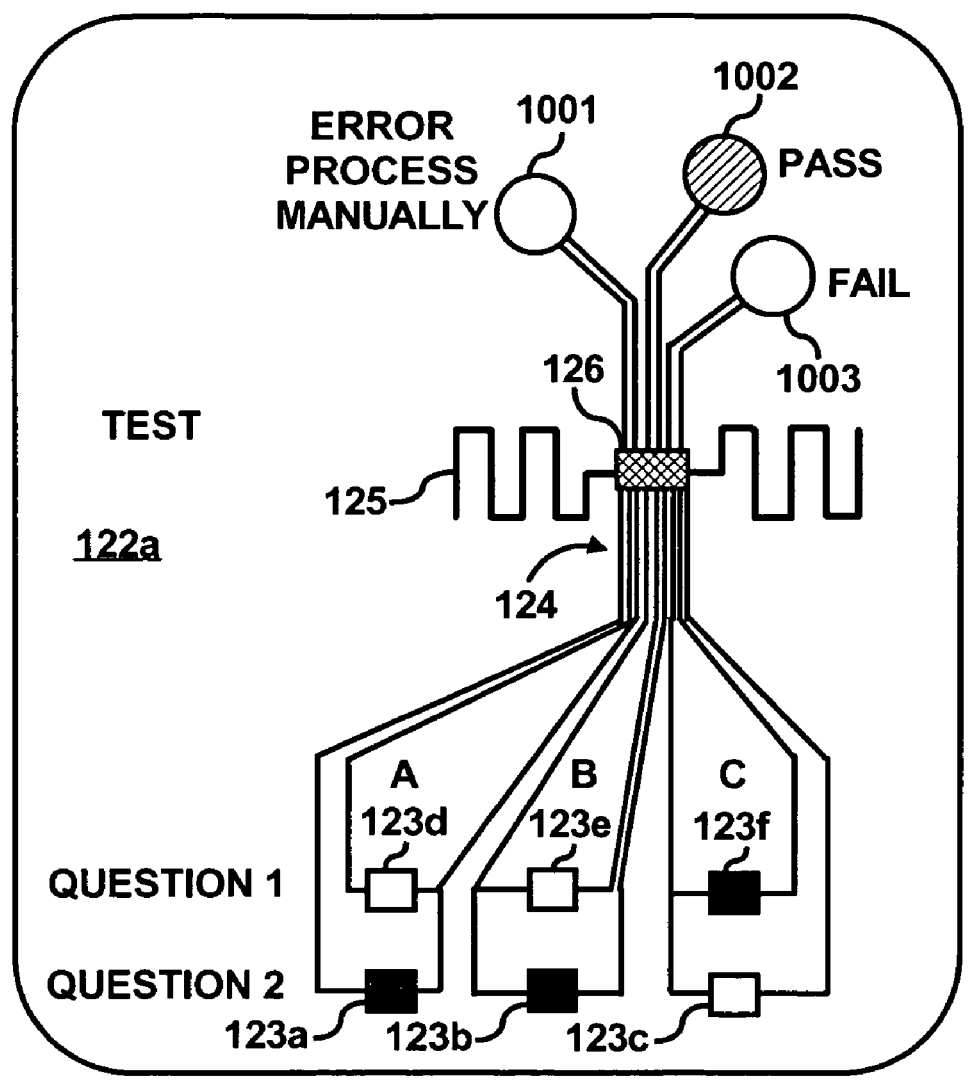

FIGS. 10 and 11 illustrate embodiments of tags used for surveys and tests. Typically, surveys and tests are often conducted by having people mark papers. The tags shown in FIGS. 10 and 11 utilize the familiar paper interface or other medium that can be marked by a person filling out a survey or test. Also, marking the tags changes bits stored in the tags that represent the information marked on the tags. These bits may be read by the reading device 110 shown in FIG. 1 to provide results of a completed survey or test substantially immediately if desired. Furthermore, the reading device 110 may be used to determine whether the survey or test was completely filled out.

FIG. 10 illustrates a tag 120a providing a survey. The survey is completed by marking portions 123a, 123b, 123c, or 123d of the medium 122a with, for example, conductive ink. Marking any of these portions with conductive ink modifies bits stored in the RFID circuit 121a representing the marked portions, such as described with respect to FIG. 3D. The tag 120a may be read by the reading device 110 to determine the results of the survey. For example, when the tag 120a is read, the bits of information corresponding to the marked portions 123a and 123d and the tag serial number are read. The information received from the tag 120a may be transmitted to the remote location 130 and possibly aggregated with other survey results for a poll. In another embodiment, the bits representing the marked portions, which are stored in the RFID circuit 121a, are used to generate a unique ID for the survey. For example, checksum or another function is performed on the bits to generate the unique ID. This unique ID is stored in the RFID circuit 121a and transmitted to the reading device 110 when the tag 120a is read. The information received from the tag 120a this indicates both a unique ID for that particular survey and the state of the survey.

The tag 120a may include a visual indicator operable to be activated based on data stored or modified in the RFID circuit. For example, the tag 120a may also provide a visual indication of the RFID scan. For example, the tag 120a includes two ink capsules 1001 and 1002. After the tag 120a is read by the reading device 110 and the survey is determined to be fully completed by the reading device 110, the reading device 110 instructs the tag 120a to fire the "OK" ink capsule 1002. If the reading device 110 determines the survey is not fully completed, the reading device 110 instructs the tag 120a to fire the "Reject" ink capsule 1001. A fully completed survey or test, for example, is a survey or test where all the questions are answered that are not considered optionally or all the required information is provided. Other types of indicators may be used, such as LEDs. Also, instead of conductive ink, the medium 122a may include a resistive strip or conductors that may be broken by physically altering a portion of the medium 122a.

Also, indicators other than visual indicators may be used on the tag 120a. For example, an audio indicator, such as a piezoelectric buzzer, an olfactory indicator, such as a capsule of perfume, or a tactile indicator may be used.

The survey provided on the tag 120a is just as easy to complete as the conventional, printed, paper-style survey, yet the tag 120a may be read almost instantaneously and from a distance. In addition, there is a visual indication that the survey is complete and has been read, so users can simultaneously wave several surveys past the reader and then visually confirm which have been read and that they were correctly filled-out.

The same techniques shown in FIG. 10 may be used for multi-choice tests, such as shown in FIG. 11. A visual indication using ink capsules 1001-1003 or other types of indicators may be used to indicate whether test taker passed or failed or whether all the information was read from the tag 120a. Thus, the results of the test can be displayed substantially immediately.

Instead of marking portions of the medium 122a, in other embodiments, the breaking conductors or resistive strips may be used to detect physically altering portions of the medium 122a to modify bits stored in the RFID circuit 121a. Also, the embodiments shown in FIGS. 10 and 11 may be used in other applications, such as completing forms at a hospital or forms for checking-in at a hotel or conference.

In embodiments using a visual indicator or other type of indicator that generates an output on the tag medium, such as a flashing LED or ink from a blown ink capsule, the RFID circuit is operable to generate a visual indication using the visual indicator based on a detected physical altering of a tag medium, such as the medium 122a shown in FIG. 10. For example, the RFID circuit 121a detects a marking of conductive ink at portion 123a. The RFID circuit 121a sets a value for a bit stored in the RFID circuit associated in response to detecting the marking. A reader reads the value of the bit and writes a bit to the RFID circuit 121a. The RFID circuit 121a detects the write, such as a value of a bit written to the RFID circuit, and may activate the visual indicator based on the value of the written bit.

Figure 5:
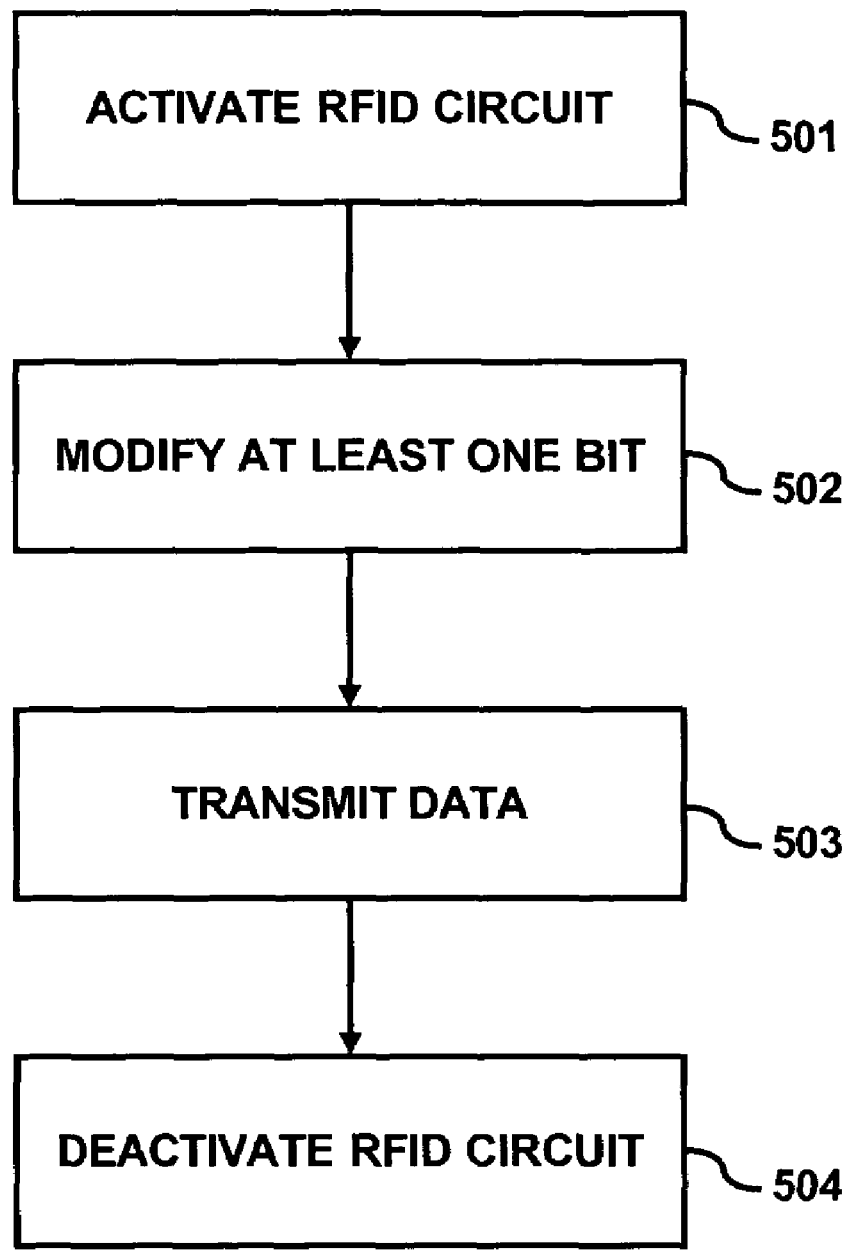
FIG. 5 illustrates a flow chart of a method, according to an embodiment.

FIG. 5 illustrates a flow chart of a method 500, according to an embodiment. The method 500 is described with respect to FIGS. 1-4 by way of example and not limitation. At step 501, the RFID circuit 121a is activated in response to first action performed on the user interface for the tag 120a. Any portion of the medium 122a that may be physically altered to modify bits stored in the RFID circuit 121a or activate or deactivate the RFID circuit 121a is, for example, a user interface for the tag 120a. The first action, for example, includes physically altering a portion of the tag 120a, such as any of the portions 123a-e shown in FIG. 3A.

At step 502, at least one bit stored in the RFID circuit 121a is modified in response to another action performed on the user interface. For example, the tag 120a is placed on a victim. In order to indicate a priority level for the victim, the tag 120a is physically altered. For example, the portions 123a-c are removed from the tag 120a shown in FIG. 3A to modify at least one bit representing priority level for the victim, such as modifying "00" to "01" stored in the RFID circuit 121a. In other examples more than two bits may be modified to represent other data about the victim or the victim's injury, such as a nature of a victim's injury, an ID for the victim (however the ID may be the tag serial number provided by the manufacturer), the victim's medical condition, the victim's initial treatment, physical characteristics of the victim, the location to which the victim was transported or assigned, and the like.

At step 503, data stored in the RFID circuit 121a is transmitted to the reading device 110. For example, the bits stored in the RFID circuit 121a are transmitted to the reading device 110.

At step 504, the tag 120a is deactivated in response to another action performed on the user interface. For example, the portion 123f shown in FIGS. 3B and 3C is physically altered resulting in deactivation of the RFID circuit 121a.

It will be apparent to one of ordinary skill in the art that the method 500 may be modified. For example, the steps 501 and 504 are optional.

Figure 6:
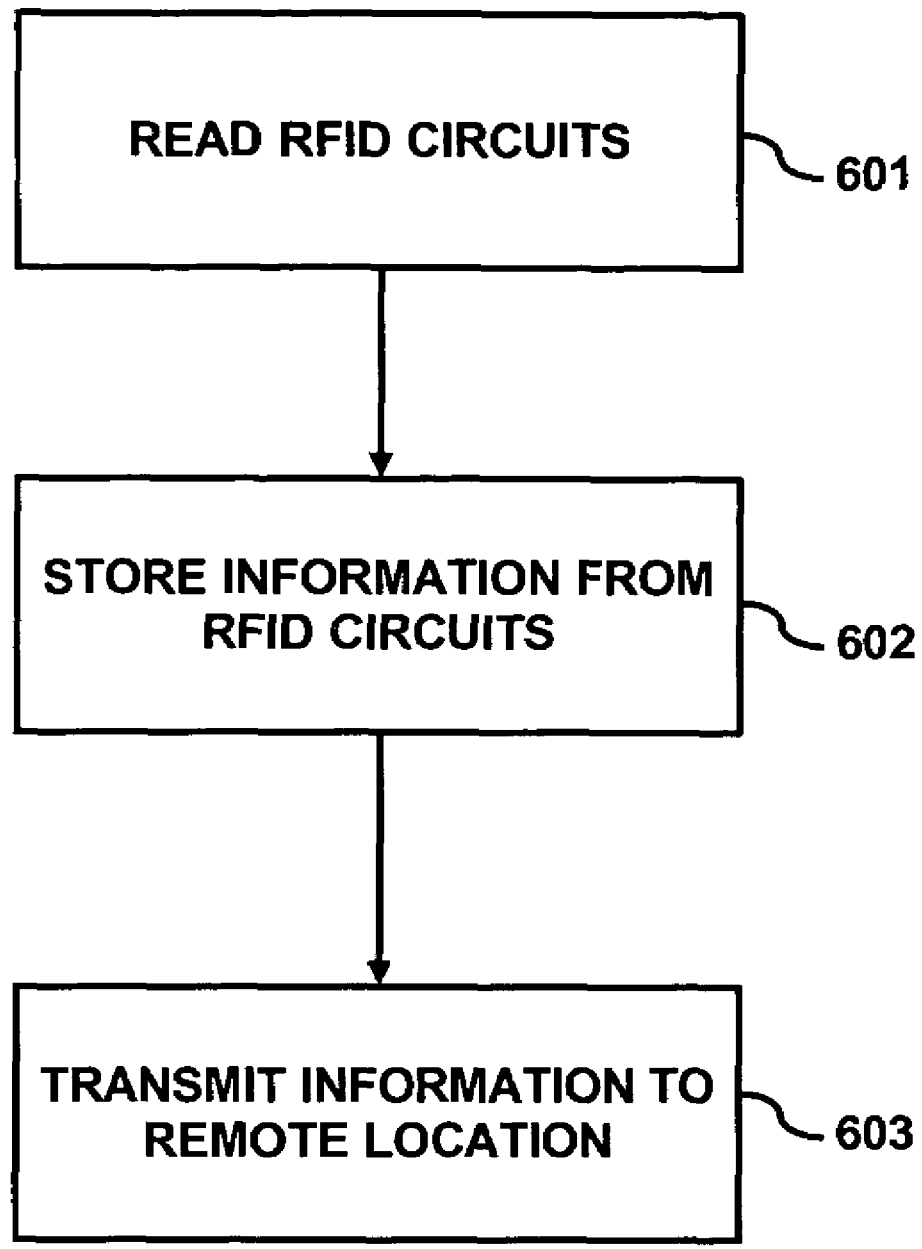
FIG. 6 illustrates a flow chart of another method, according to an embodiment; a FIG. 7A illustrates an embodiment of a tag.

FIG. 6 illustrates a flow chart of a method 600, according to an embodiment. The method 600 is described with respect to FIGS. 1-4 by way of example and not limitation. At step 601, the reading device 110 reads each of the tags 120a . . . n. For example, the RFID circuits 121a . . . n are read. The tags 120a . . . n may not necessarily be read at the same time, especially if the tags 120a . . . n are spread apart or located in different areas. The information read from the RFID circuits 121a . . . n may include modified bits representing victims' information.

At step 602, the reading device 110 stores the information read from the RFID circuits 121a . . . n in the storage 113.

Information may be selectively displayed on the display 114 in response to commands input via the input device 115.

At step 603, the reading device 110 transmits the information read from the RFID circuits 121*a* . . . *n* to the remote location 130 via the network 140 or through another means for communicating data. The information may be stored in the database 132 at the remote location 130 and queried by the server 131.

It will be apparent to one of ordinary skill in the art that the method 600 may be modified. For example, the step 603 is optional.

Figure 12:
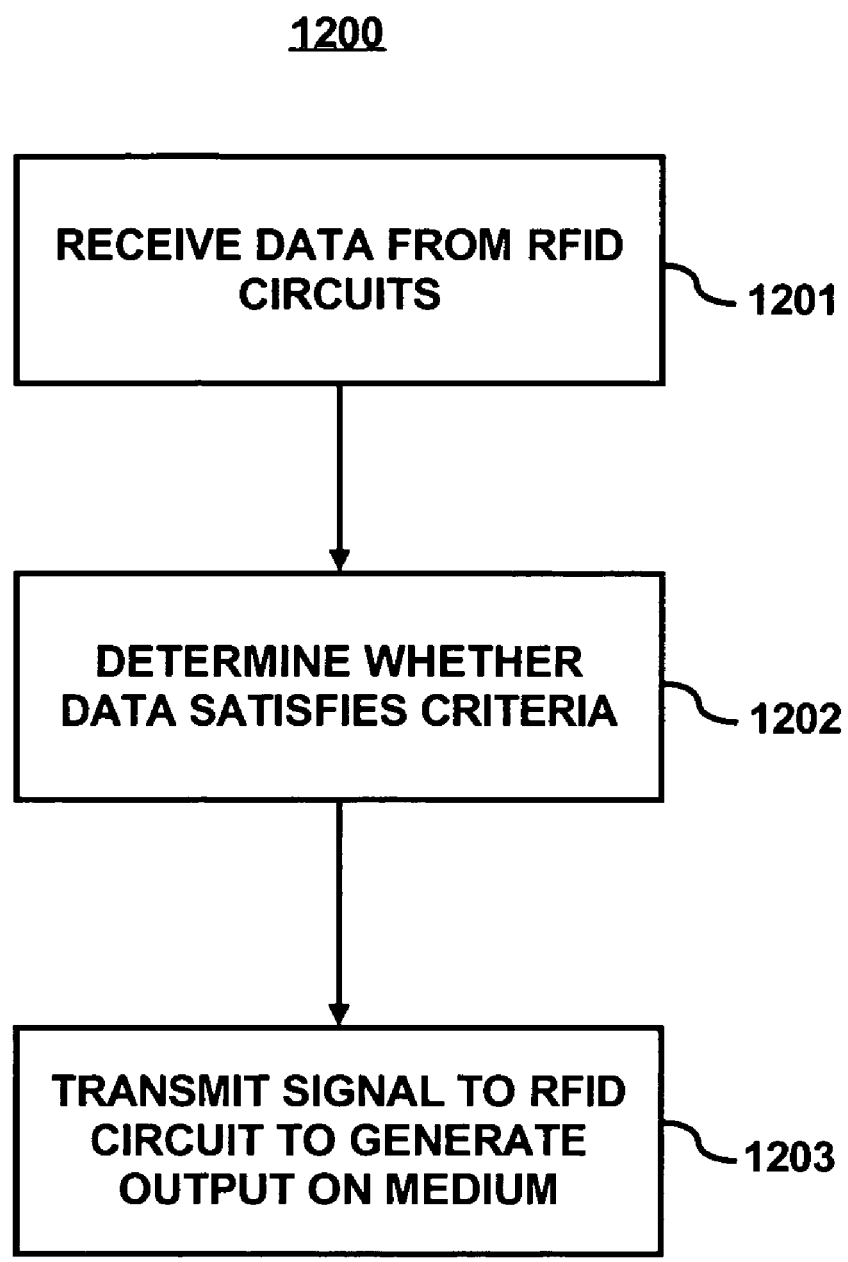
FIG. 12 illustrates a flow chart of another method, according to an embodiment.

FIG. 12 illustrates a method 1200, according to an embodiment. The method 1200 is described with respect to the tags shown in FIGS. 10 and 11 and the system 100 shown in FIG. 1 by way of example and not limitation. At step 1201, the reading device 110 receives data from the RFID circuit 121*a*, where at least some of the data includes at least one bit modified in response to physically altering a portion of the medium 122*a* that the RFID circuit 121*a* is affixed. At step 1202, the reading device 110 or another device 110, such as the remote location 130, determines whether information represented by the data received from the RFID circuit satisfies at least one criteria. For example, the reading device 110 determines whether the survey shown in FIG. 10 was fully completed or determines whether the test shown in FIG. 11 was passed. At step 1203, the reading device 110 transmits a signal to the RFID circuit 121*a*, wherein the RFID circuit is operable to generate an output on the medium 122*a* based on the signal. For example, the reading device 110 instructs the RFID circuit 121*a* shown in FIG. 10 to fire the ink capsule 1002 if the survey was fully completed, or the reading device 110 instructs the RFID circuit 121*a* shown in FIG. 11 to fire the ink capsule 1002 if the test was passed.

The system 100 and the tags described above may be used in different system also described system. One particular example of the system 100 is a system used by emergency personnel responding to an emergency where there may be multiple victims. A victim is anyone that is injured. Typically, the first emergency personnel to arrive at an emergency perform triage. Triage may include sorting victims into groups, such as by priority level. Each priority level is based on a victim's need for medical treatment. For example, their may be priority levels for deceased, for people needing immediate medical treatment that for example have sustained a life-threatening injury, and for people that need medical treatment but do not have life-threatening injuries.

The tags 120*a* . . . *n* are used by the emergency personnel for triage. For example, each of the tags 120*a* . . . *n* are placed on victims. The tags 120*a* . . . *n* are physically altered. For example, the tags 120*a* . . . *n* may be physically altered to activate the tags 120*a* . . . *n*. Activating includes making an RFID circuit on a tag readable. For example, the RFID circuit may be deactivated, such that it is not readable even if an interrogation signal is received. If the RFID circuit 121*a* includes a passive RFID chip, then the RFID circuit 121*a* receives power from an interrogation signal generated by the reading device 110 as is known in the art, and the RFID circuit 121*a* transmits data back to the reading device 110. If the RFID circuit 121*a* is deactivated, then the RFID circuit 121*a* is not operable to transmit data even in response to an interrogation signal. After the RFID circuit 121*a* is activated, such as in response to physically altering the medium 122*a*, then the RFID circuit 121*a* is operable to transmit data to the reading device 110. Instead of including a passive RFID chip, the RFID circuit 121*a* may include an active or semi-passive RFID chip that has a power source. In those instances, if the RFID circuit 121*a* is deactivated, then the RFID circuit 121*a* is not operable to transmit data until it is activated. Deactivating and activating an RFID circuit may be performed in response to actions including physically altering portions of a medium.

Also, the tags 120*a* . . . *n* may be physically alterable to modify data stored in the tag that represents the priority level of the victim. For example, a portion of a tag's medium may be torn to indicate a level 1 priority and another portion of the tag may be torn to indicate a level 2 priority. In another example, a conductive ink or pencil may be used to mark a specific portion of the tag's medium to indicate priority level. In response to the action of physically altering the tag's medium, one or more bits stored in the RFID circuit are modified. These bits are read by the reader 111 in the reading device 110 to determine information, such as priority level, for the victims. In addition to priority level, the bits stored in the RFID circuit may represent other information about a victim, such as a unique ID, the victim's initial treatment, the nature of the victim's injury, physical characteristic(s) of the victim, and other information about the victim. One or more of the bits representing this information may be modifiable. For example, the unique ID may be provided at the manufacturer of the RFID circuit, but the bits representing the other information may be modified by the emergency personnel.

The reader 111 in the reading device 110 reads the data from the tags 120*a* . . . *n*, such as the bits stored in each of the RFID circuits 121*a* . . . *n*. In one example, the reading device 110 is a mobile device that can be carried by a person, such as emergency personnel. For example, after the data representing information for each victim is stored in the respective tags 120*a* . . . *n*, one of the emergency personnel walks through the emergency area with the reading device 110 reading the tags 120*a* . . . *n*. Victims with high priority levels are quickly identified and are given immediate medical treatment and may be immediately transported to a medical facility. Victims with lower priority levels may be moved to a staging area and given medical treatment after the victims with higher priority levels are treated.

The reading device 110 may save time over conventional practices that require emergency personnel to view written tags on each victim to identify victims with high-priority levels. Using the reading device 110, emergency personnel can identify a victim's priority level when a tag is in range of the reading device. Furthermore, the reading device 110 may include alerts when high priority victims are in range, such as activating an audio alarm on the reading device 110 or providing a visual alarm on the display 114. Furthermore, the reading device 110 optionally includes a directional antenna 119 connected to the reader 111. The directional antenna 119 may be used to identify a proximate location of a victim at an emergency area. For example, the directional antenna is pointed in the direction of one or more victims having tags 120*a* and 120*b* and the reader 111 reads the data from those tags. The reading device 110 may be set to provide a visual alert for high priority victims. If any of the victims with tags 120*a* or 120*b* has a high priority level, the visual alert on the display 114 is generated by the controller 112. The emergency personnel using the reading device 110 is then notified that a victim with severe injuries in the proximate location in the direction where the directional antenna 119 is pointed.

The directional antenna 119 may also be used to find a particular victim if the unique ID of the victims tag is known. For example, the unique ID of the tag for the victim is input via to the reading device 110 via the input device 115. The reader 111 reads the tags 120a . . . *n* as the directional antenna 119 is pointed in the direction of each of the tags 120a . . . *n*, and the controller 112 compares the unique ID of each tag to the unique ID of the tag for the victim being located. When the directional antenna 119 is pointed at the victim being located, a visual alert may be provided via the display 114, and the emergency personnel are notified that the victim is in the direction that the directional antenna 119 is pointed.

As described above, the reading device 110 may be a mobile device carried by emergency personnel. The reading device 110 may be used at other locations, such as in an ambulance or other emergency vehicles. For example, as a victim is loaded into an ambulance, the tag for the victim is read by a reading device in the ambulance. Location information may also be stored for the victim and used to track the victim. In other examples, the reading device 110 may be used at different locations in a hospital to track patients.

In addition to being able to read victim information from the tags 120a . . . *n*, the system 100 is operable to process the victim information. For example, the reading device 110 reads the victim information from the tags 120a . . . *n*. The information is then transmitted to the remote location 130, where it may be stored in the database 130. From the information from the tags 120a . . . *n*, a user at the remote location 130 may determine information such as the number of victims, the number of victims at each priority level, the number of victims at each location if a location sensor is used, which locations have the most severely injured victims, and victim tracking information, such as where a victim was previously located and the victim's destination. At the remote location 130, a user may dispatch emergency personnel and equipment to the most appropriate location. For example, emergency personnel may be dispatched to the location with the largest number of victims having a level 1 priority level. Also, emergency personnel may be tracked. For example, emergency personnel may be tracked if they have tags. Also, if it is known that one of the emergency personnel is responsible for tags having a set of unique IDs, then the location of that person may be assumed to be the location of those tags.

FIG. 2 illustrates another embodiment of the system 100 shown in FIG. 1. The system 100 shown in FIG. 2 may be used in different types of systems including but not limited to an emergency personnel system. In FIG. 2, the reading device 110 includes a location sensor 150. An example of a location sensor 150 is a GPS sensor, but other types of location sensors may be used. The reading device 110 may store location information when data from a tag of the tags 120a . . . *n* is read. The location information is stored in the storage 113 with the data. For example, the reader 111 of the reading device 110 reads the data from the RFID circuit 121a. The data includes a victim's information, such as unique ID, priority level, and possibly other information for the victim described above. Location information is determined for the reading device 110 when the RFID circuit 121a is read. This location information is stored in the storage 113 along with the victim's information. The location information along with the victim's information may be transmitted to the remote location 130 and stored in the database 132. The location information, for example, may include coordinates determined by the location sensor 150, such as latitude, longitude and altitude.

FIG. 2 also illustrates an optional container 160 including optional tags 162. The tags 162 may each include an RFID circuit and medium, such as the tags 120a . . . *n*. When the tags 162 are removed from the container 160, the reading device 110 reads the tags 162 and the location sensor 150 automatically determines location information. The storage 113 may store the unique ID of each of the tags 162 and the location information. Thus, the tags 162 may be tracked starting from the removal of the tags 162 from the container 160. The tags may then be placed on victims by emergency personnel and the priority level for each victim may be stored in each tag for future readings by the reading device 110. The tags 120a . . . *n* may also have been held in the container 160 and the removal of the tags 120a . . . *n* triggered a reading of the tags 120a . . . *n* and determination of location of information, and storage of the data read from the tags 120a . . . *n* and the location information in the storage 113. This information may also be transmitted to the remote location 130.

In one example, a sensor 163 is used to detect removal of a tag from the container 160. An example of a sensor includes a short-range RFID reader that detects the removal of a tag, such as when a tag is out of range it is assumed the tag is removed. In another example, the sensor 163 includes a mechanical or electro-mechanical sensor operable to detect removal of a tag from the container 160. The sensor 163 may transmit a signal to the reading device 110 when a tag is removed from the container 160 so the location of the tag is stored. The tag location may then be programmed into the tag as it slides past the reader on the way out of the box, or it may be associated with the ID of the tag and stored/transmitted for later use. In one example, a roll or pad of paper tags (much like a roll or pad of paper tickets) are used. Tearing off one tag breaks a wire and either activates the tag or changes its ID. Then a reader/location sensing system near the roll or pad may read each tag as it was torn off.

Figure 13:
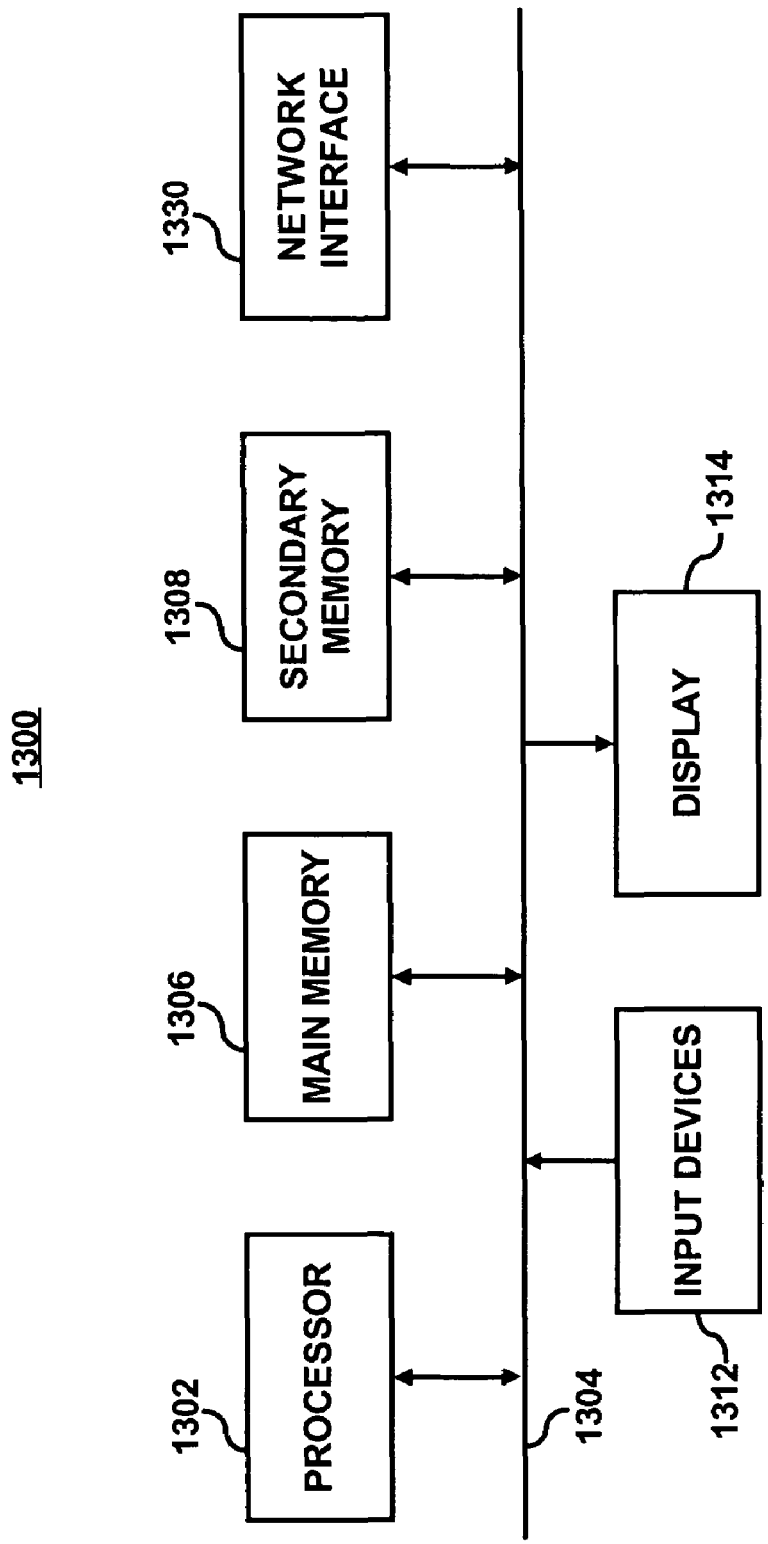
FIG. 13 illustrates a computer system, according to an embodiment.

FIG. 13 illustrates an example of a hardware platform for the reading device 110 shown in FIG. 1. For example, the hardware platform includes a computer system 1300. The computer system 1300 includes one or more processors, such as processor 1302, providing an execution platform for executing software. The controller 112 may include the processor 1302. Commands and data from the processor 1302 are communicated over a communication bus 1304. The computer system 1300 also includes a main memory 1306, such as a Random Access Memory (RAM), where software may be resident during runtime, and a secondary memory 1308. The secondary memory 1308 includes, for example, a hard disk drive or other type of storage device. Other examples of the secondary memory 1308 include ROM (read only memory), EPROM (erasable, programmable ROM), EEPROM (electrically erasable, programmable ROM).

The computer system 1300 optionally includes user interfaces comprising one or more input devices 1312, such as a keyboard, a mouse, a stylus, and the like. The computer system 1300 also optionally includes a display 1314. A network interface 1310 is provided for communicating with other computer systems. The I/O interface 116 shown in FIGS. 1 and 2 may include the network interface 1330. It will be apparent to one of ordinary skill in the art that the computer system 1300 may include more or less features depending on the complexity of the system needed.

According to an embodiment, one or more of the steps of the methods 500, 600, 700, and 1200 are is implemented as software embedded on a computer readable medium, such as the memory 1306 and/or 1308, and executed on the computer system 1300, for example, by the processor 1302.

The steps are embodied in a computer program, which may exist in a variety of forms both active and inactive. For example, the steps exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method comprising:
    activating an RFID circuit in response to a first action performed on a user interface for the RFID circuit, wherein the first action includes physically altering a medium that at least a portion of the RFID circuit is affixed;
    transmitting information from the RFID circuit; and
    modifying at least one bit stored in the RFID circuit in response to another action performed on the user interface.

2. The method of claim 1, further comprising:
    deactivating the RFID circuit in response to a second action performed on the user interface.

3. The method of claim 1, wherein the at least one bit indicates at least one of a triage priority for a victim; a nature of a victim's injury; an ID for the victim; the victim's medical condition; the victim's initial treatment; physical characteristics of the victim; and the location to which the victim was transported or assigned.

4. The method of claim 1, wherein the first action comprises at least one of tearing, puncturing, and breaking the medium.

5. The method of claim 1, wherein the first action comprises closing a circuit of the RFID circuit.

6. The method of claim 5, further comprising using at least one of conductive ink and graphite to close the circuit.

7. The method of claim 1, further comprising:
    generating an indication in response to the at least one modified bit read from the RFID circuit, wherein the indication includes at least one of a visual indication on the medium, an audio indication, an olfactory indication, and a tactile indication.

8. A method comprising:
    reading information from a plurality of RFID circuits, wherein each of the RFID circuits are operable to modify at least one bit of information stored in the RFID circuit in response to an action including physically altering at least a portion of a medium that at least a portion of the RFID circuit is affixed;
    determining a number of RFID circuits storing information representing items having particular characteristics, wherein the at least one modifiable bit in each RFID circuit represents a particular characteristic; and
    storing the information read from each RFID circuit.

9. The method of claim 8, wherein each RFID circuit is operable to be activated in response to another action including physically altering a portion of the medium.

10. The method of claim 9, wherein each RFID circuit is operable to be deactivated in response to yet another action including physically altering a portion of the medium.

11. The method of claim 8, further comprising:
    storing location information for the RFID circuits.

12. The method of claim 11, wherein storing location information further comprises:
    storing the location information when the RFID circuit is first activated.

13. The method of claim 12, wherein storing location information further comprises:
    storing the location information when the RFID circuit is first activated in response to removing the RFID circuits from a container.

14. The method of claim 11, further comprising:
    transmitting the information read from the RFID circuits and the location information to a remote location.

15. The method of claim 11, further comprising:
    determining a number of RFID circuits having particular characteristics at a location based on the location information and the information read from the RFID circuits.

16. The method of claim 11, further comprising:
    reading the plurality of RFID circuits using a directional antenna to determine a proximate location of each of the plurality of RFID circuits.

17. A system comprising:
    a plurality of tags;
    a reading device operable to read an RFID circuit for each of the plurality of tags,
    wherein each RFID circuit is operable to be activated in response to a first action including physically altering a medium that at least a portion of the RFID circuit is affixed and each RFID circuit is operable to modify at least one bit of information stored in the RFID circuit in response to a second action including physically altering at least a portion of the medium.

18. The system of claim 17, wherein the reading device comprises:
    an RFID tag reader operable to read the RFID circuits;
    a controller;
    a location sensor operable to determine a location; and
    storage for storing data read from the plurality of tags.

19. The system of claim 17, wherein the reading device further comprises:
    a directional antenna for reading RFID circuits located in a predetermined direction and range from the antenna.

20. The system of claim 17, wherein the reading device further comprises:
a display; and
a user interface, wherein the controller is operable display information read from one or more of the plurality of RFID circuits in response to commands received via the use interface.

21. A tag comprising:
an RFID circuit;
a medium, wherein at least a portion of the RFID circuit is affixed to the medium and wherein the RFID circuit is operable to be activated such that the RFID circuit is operable to transmit data in response to physically altering the medium where the at least a portion of the RFID circuit is affixed; and
wherein the RFID circuit is operable to store a plurality of bits, wherein at least one bit of the plurality of bits is modified in response to the medium, where another portion of the RFID circuit is affixed, being physically altered.

22. The tag of claim 21, wherein the RFID circuit is operable to be deactivated such that the RFID circuit is inoperable to transmit stored information in response to physically altering the medium where another portion of the RFID is affixed.

23. The tag of claim 21, wherein the at least a portion of the RFID circuit comprises conductors affixed to portions of the medium operable to be physically altered.

24. The tag of claim 21, wherein the at least a portion of the RFID circuit comprises at least one resistive strip affixed to portions of the medium operable to be physically altered.

25. The tag of claim 21, further comprising:
a visual indicator operable to be activated based on data stored in the RFID circuit.

26. An apparatus comprising:
RFID chip means for storing a plurality of bits;
bit modification circuit means for modifying at least one of the plurality bits in response to physically altering a portion of a medium that the RFID chip means is affixed; and
an activation/deactivation circuit means for activating or deactivating the RFID chip means circuit in response to physically altering another portion of the medium.

27. The apparatus of claim 26, further comprising:
conductor means for carrying a signal to the bit modification circuit means or the activation/deactivation circuit means, wherein the conductor means is affixed to the portion and the another portion of the medium.

28. The apparatus of claim 26, further comprising:
resistive strip means for carrying a signal to the bit modification circuit means or the activation/deactivation circuit means, wherein the resistive strip means is affixed to the portion and the another portion of the medium.

29. An apparatus comprising:
an RFID circuit;
a medium, wherein at least a portion of the RFID circuit is affixed to the medium and wherein the RFID circuit is operable to generate an output on the medium;
wherein the RFID circuit includes a bit modification circuit operable to modify at least one bit stored in the RFID circuit in response to physically altering a portion of the medium;
wherein the RFID circuit comprises an indicator and the output comprises an indication generated by the indicator; and
wherein the indicator comprises at least one of a visual, audio, olfactory, and tactile indicator.

30. The apparatus of claim 29, wherein the RFID circuit generates the indication depending on a value of at least one bit stored in the RFID circuit.

31. The apparatus tag of claim 30, wherein a reader is operable to write the at least one bit in the RFID circuit in response to detecting a physical altering of the medium.

32. A tag comprising:
an RFID circuit including a resistive strip; and
a medium, wherein the resistive strip is affixed to the medium and wherein the RFID circuit is operable to change the availability of information stored in the tag in response to physically altering the medium where the resistive strip is affixed by physically modifying at least one bit stored in the RFID circuit,
wherein the RFID circuit is operable to be activated such that the RFID circuit is operable to transmit data in response to physically altering the medium where at least a portion of the RFID circuit is affixed.

33. A method comprising:
detecting a physical action on a medium, wherein at least a portion of an RFID circuit is affixed to the medium, and wherein the physical action is representative of an indication that information in the tag is to be made unreadable;
masking at least one bit stored in the RFID circuit using a bit mask in response to detecting the physical action without changing the at least one bit; and
transmitting the masked at least one bit to a reader.

34. The method of claim 33, further comprising:
setting a value for a lock bit associated with the detected physical action; and
determining the at least one bit from a plurality of bits to selectively mask based on a value for the lock bit.

35. A method comprising:
detecting a physical action on a medium, wherein at least a portion of an RFID circuit is affixed to the medium;
setting a value of a first lock bit associated with the detected physical action;
writing a value for at least one bit of a plurality of bits associated with the first lock bit; and
setting a value of a second lock bit indicating that the value for the at least one bit has been written.

36. A method comprising:
determining regions of memory in an RFID circuit;
associating a physical action with an access control for each region;
detecting one of the physical actions;
changing the access control of the region associated with the detected physical action;
receiving a request for access to the memory; and
providing access to only the regions allowed by the access control for each region.

37. The method of claim 36, wherein the access control comprises at least one of granting and denying at least one of read and write access to a region.

38. The method of claim 36, wherein changing the access control further comprises:

denying access to the region associated with the detected physical action.

39. The method of claim 38, wherein providing access to only the regions allowed by the access control further comprises:

masking the region.

40. The method of claim 38, wherein providing access to only the regions allowed by the access control further comprises:

making the region where access is denied invisible to a user or device accessing the memory.

* * * * *

UNITED STATES PATENT AND TRADEMARK OFFICE
CERTIFICATE OF CORRECTION

PATENT NO. : 7,304,578 B1 Page 1 of 1
APPLICATION NO. : 11/143225
DATED : December 4, 2007
INVENTOR(S) : Craig Peter Sayers et al.

It is certified that error appears in the above-identified patent and that said Letters Patent is hereby corrected as shown below:

In column 1, line 42, delete "FIG. 3A-E" and insert -- FIGS. 3A-E --, therefor.

In column 1, line 48, after "embodiment;" delete "a".

In column 7, line 12, delete "12a-d" and insert -- 123a-d --, therefor.

In column 10, line 40, after "include" delete "and" and insert -- an --, therefor.

In column 19, line 7, in Claim 20, delete "use" and insert -- user --, therefor.

Signed and Sealed this

Twenty-third Day of June, 2009

JOHN DOLL
*Acting Director of the United States Patent and Trademark Office*